US012773859B2

(12) United States Patent
Abe et al.

(10) Patent No.: US 12,773,859 B2
(45) Date of Patent: Oct. 27, 2026

(54) DRYING APPARATUS INCLUDING CIRCULATION PATH AND ADJUSTABLE EXHAUST MECHANISM FOR TEMPERATURE CONTROL

(71) Applicant: CANON KABUSHIKI KAISHA, Tokyo (JP)

(72) Inventors: Yoshikazu Abe, Kanagawa (JP); Toshinobu Tokita, Kanagawa (JP); Waichiro Saiki, Kanagawa (JP); Hiroki Inoue, Tokyo (JP); Toshiro Sugiyama, Kanagawa (JP); Tomoyuki Nagase, Kanagawa (JP); Yusuke Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 18/600,388

(22) Filed: Mar. 8, 2024

(65) Prior Publication Data

US 2024/0308246 A1 Sep. 19, 2024

(30) Foreign Application Priority Data

Mar. 14, 2023 (JP) ................................ 2023-039882

(51) Int. Cl.
*B41J 11/00* (2006.01)

(52) U.S. Cl.
CPC .... *B41J 11/00222* (2021.01); *B41J 11/00224* (2021.01); *B41J 11/00242* (2021.01)

(58) Field of Classification Search
CPC ........... B41J 11/00222; B41J 11/00224; B41J 11/00242
See application file for complete search history.

(56) References Cited

U.S. PATENT DOCUMENTS

| | | | | |
|---|---|---|---|---|
| 5,020,244 | A | 6/1991 | Smith | |
| 9,302,502 | B2 * | 4/2016 | Sasaki | B41J 11/0022 |
| 2007/0059022 | A1 * | 3/2007 | Yamaoka | G03G 15/2017 399/92 |
| 2011/0063358 | A1 * | 3/2011 | Muro | B41J 29/377 347/17 |

(Continued)

FOREIGN PATENT DOCUMENTS

| | | |
|---|---|---|
| JP | 2009034931 A | 2/2009 |
| JP | 2013029268 A | 2/2013 |

(Continued)

*Primary Examiner* — Bradley W Thies
(74) *Attorney, Agent, or Firm* — Canon.U.S.A., Inc. IP Division

(57) ABSTRACT

A drying device includes a conveying unit to convey a medium to which liquid is discharged from a discharging head, a hot air blowing unit, a passage forming unit, and an adjusting unit. The hot air blowing unit includes a blowing unit, and a heating unit. The passage forming unit forms, between the hot air blowing unit and a region on a conveyance path of the conveying unit, a circulation path through which air blown from the hot air blowing unit is to be circulated. The adjusting unit adjusts an amount of air outside the circulation path that is supplied to the blowing unit. The circulation path includes an introduction portion, and an exhaust portion. The adjusting unit includes a movable member that changes an exhaust portion opening amount.

15 Claims, 17 Drawing Sheets

(56) References Cited

U.S. PATENT DOCUMENTS

| | | | |
|---|---|---|---|
| 2011/0261102 | A1 | 10/2011 | Kurasawa |
| 2015/0174924 | A1 | 6/2015 | Fuchioka |
| 2016/0355027 | A1 | 12/2016 | Valero Navazo |
| 2018/0222214 | A1 | 8/2018 | Llorach To |
| 2019/0283463 | A1 | 9/2019 | Nishimura |
| 2021/0146704 | A1 * | 5/2021 | Yoda .................... B41J 11/0022 |
| 2022/0402278 | A1 | 12/2022 | Maida |
| 2022/0402281 | A1 | 12/2022 | Maida |
| 2023/0294420 | A1 * | 9/2023 | Naramatsu ......... B41J 11/00222 347/102 |

FOREIGN PATENT DOCUMENTS

| | | | |
|---|---|---|---|
| JP | 2016087926 | A | 5/2016 |
| JP | 2018008475 | A | 1/2018 |

* cited by examiner

DRYING APPARATUS INCLUDING CIRCULATION PATH AND ADJUSTABLE EXHAUST MECHANISM FOR TEMPERATURE CONTROL

BACKGROUND

Field

The present disclosure relates to a drying device.

Description of the Related Art

As a technique of drying a liquid on a medium such as paper, there is known a technique of promoting drying of a liquid by blowing hot air to a medium. For example, U.S. Patent App. Pub. No. 2018/0222214 discloses a technique of discharging emulsion ink to a medium and then drying the emulsion ink using hot air to fix it to the medium. U.S. Patent App. Pub. No. 2018/0222214 also discloses a technique of circulating hot air. By circulating hot air, power of a heater that heats air can be saved.

A drying device sometimes needs to change the temperature of hot air. For example, the heat resistance differs depending on the medium, and the temperature of hot air sometimes needs to change to a temperature suited to the medium. More specifically, if the temperature of hot air is not low for a low-heat-resistance medium, the medium may deteriorate. To the contrary, for a high-heat-resistance medium, the temperature of hot air is increased to complete dry in a short time, improving the throughput. The power saving effect of a heater is improved by circulating hot air. However, if the temperature of hot air is close to the specification temperature (for example, heat-resistant temperature) of a blowing mechanism such as a circulation fan, the blowing mechanism deteriorates, shortening the service life of the apparatus.

SUMMARY

The present disclosure provides a technique of suppressing shortening of the service life of an apparatus.

According to an aspect of the present disclosure, a drying device includes a conveying unit configured to convey a medium to which liquid is discharged from a discharging head, a hot air blowing unit including a blowing unit configured to blow air, and a heating unit configured to heat air blown from the blowing unit, a passage forming unit configured to form, between the hot air blowing unit and a region on a conveyance path of the conveying unit, a circulation path through which air blown from the hot air blowing unit is to be circulated, and an adjusting unit configured to adjust an amount of air outside the circulation path that is supplied to the blowing unit, wherein the circulation path includes an introduction portion configured to introduce air outside the circulation path, and an exhaust portion configured to exhaust air inside the circulation path, and wherein the adjusting unit includes a movable member configured to change an opening amount of the exhaust portion.

Further features of the present disclosure will become apparent from the following description of exemplary embodiments (with reference to the attached drawings).

DESCRIPTION OF THE EMBODIMENTS

Figure 1:
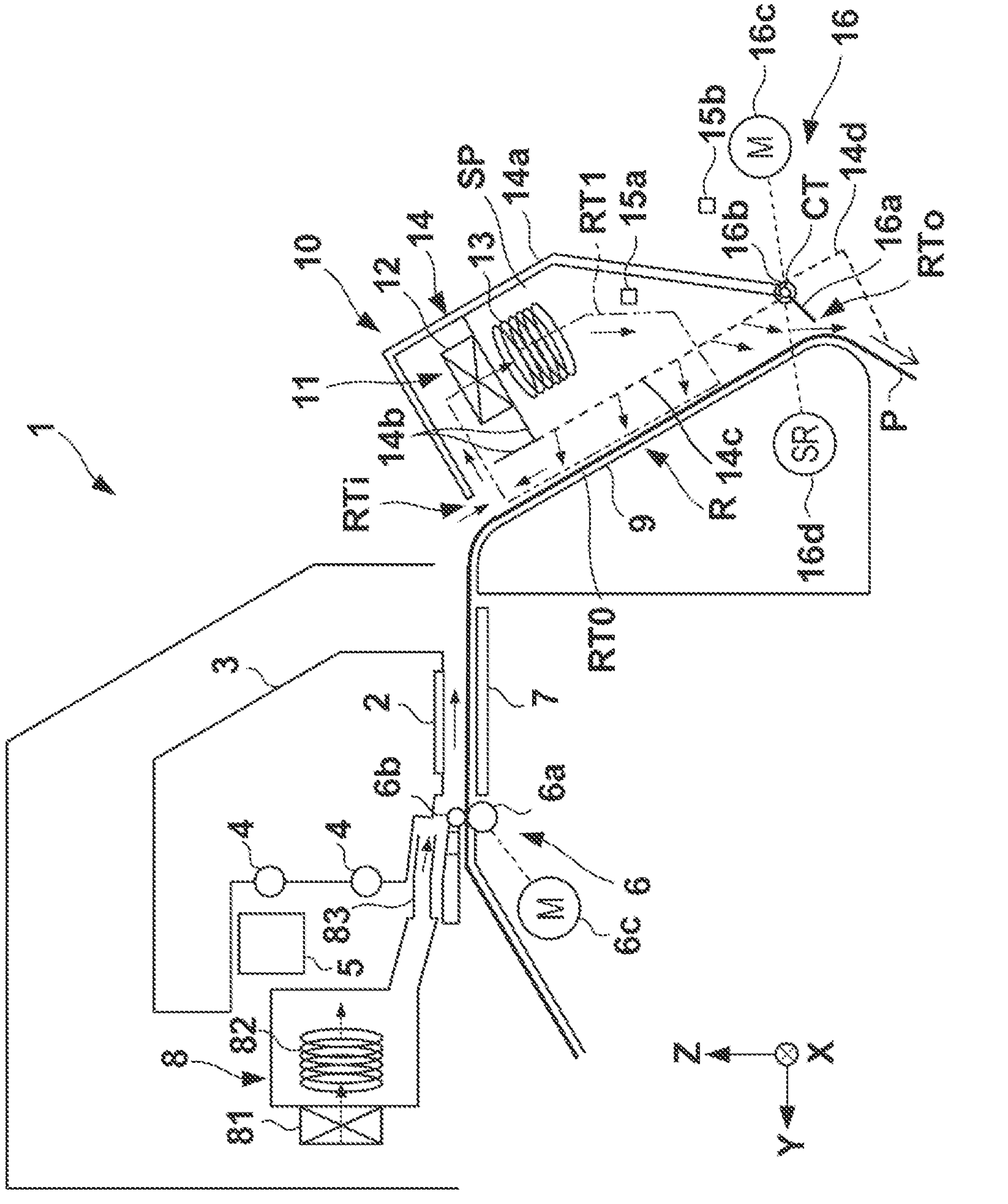
FIG. 1 is a schematic view of a printing apparatus according to an embodiment of the present disclosure.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

<Printing Apparatus>

FIG. 1 is a schematic view of a liquid discharge apparatus 1 according to an embodiment of the present disclosure. The liquid discharge apparatus 1 according to the embodiment is an inkjet printing apparatus that prints by discharging liquid ink to a printing medium. However, the present disclosure is applicable to even printing apparatuses and liquid discharge apparatuses of other types. In FIG. 1, arrows X and Y indicate horizontal directions crossing each other, and an arrow Z indicates a vertical direction. In the embodiment, the X and Y directions are perpendicular to each other.

Note that "printing" not only includes the formation of significant information such as characters and graphics, but also broadly includes the formation of images, figures, patterns, and the like on a printing medium, or the processing of the medium, regardless of whether they are significant or insignificant, and regardless of whether they are so visualized as to be visually perceivable by humans. In addition, "printing medium" can be paper, cloth, a plastic film, or the like. More specifically, "printing medium" can be an ink absorbing medium such as paper, or an ink unabsorbing medium such as vinyl chloride. A discharged ink is assumed to be emulsion ink, but can be another type of ink.

The printing apparatus 1 includes a conveying unit 6 that conveys a printing medium P. The conveying unit 6 includes a driving roller 6*a* that rotates by the driving force of a motor 6*c*, and a driven roller 6*b* that contacts the driving roller 6*a* under pressure. The printing medium P is a sheet medium, and supply and discharging of a sheet medium adopt a so-called roll-to-roll method of winding a sheet medium around rollers (not shown) different before and after printing. However, a cut sheet may be used as the printing medium P.

The conveying unit 6 conveys the printing medium P in the Y direction (−Y direction). The driving roller 6*a* is a roller extending in the X direction. A platen 7 and a discharging head 2 facing the platen 7 are provided on the downstream side of the conveying unit 6 in the conveyance direction of the printing medium P. The printing medium P is conveyed between the platen 7 and the discharging head 2.

The discharging head 2 is a printhead that discharges ink to the printing medium P on the platen 7. A carriage 3 supports the discharging head 2. The carriage 3 is guided by a guide 4 extending in the X direction and reciprocated in the X direction by a driving mechanism 5. The driving mechanism 5 is, for example, a belt transmission mechanism that includes an endless belt freely travelable in the X direction and uses a motor as a driving source. The carriage 3 is fixed to the endless belt.

The printing apparatus 1 according to the embodiment is a serial type printing apparatus in which the discharging head 2 is mounted on the carriage 3. Printing control is performed on the printing medium P by alternately repeating a conveyance operation (intermittent conveyance operation) of conveying the printing medium P by a predetermined amount by the conveying unit 6, and a printing operation during the stop of conveyance of the conveying unit 6. The printing operation is an operation of discharging ink from the discharging head 2 while moving the carriage 3 supporting the discharging head 2. The platen 7 may include a suction mechanism of sucking the printing medium P, and in the printing operation, may suck the printing medium P to prevent floating of the printing medium P. Note that the printing apparatus 1 may be a full-line type printing apparatus in which the discharging head 2 extends in the X direction without providing the carriage 3.

Next, an arrangement for drying ink discharged to the printing medium P and fixing it to the printing medium P will be explained. A hot air blowing device 8 is provided at a position upstream of the discharging head 2 in the conveyance direction of the printing medium P. The hot air blowing device 8 includes a blowing unit 81 that blows air, and a heating unit 82 that heats the air blown from the blowing unit 81. The hot air blowing device 8 blows hot air toward a region (surface of the printing medium P) between the platen 7 and the discharging head 2. This promotes evaporation of water contained in ink discharged to the surface of the printing medium P on the platen 7, and promotes drying of the ink and fixation to the printing medium P. In the embodiment, the blowing unit 81 is an electric fan, and the heating unit 82 is a coil type electrothermal transducer.

A drying device 10 is provided at a position downstream of the discharging head 2 in the conveyance direction of the printing medium P. The drying device 10 according to the embodiment shares the conveying unit 6 as the conveying mechanism of the printing medium P with the printing mechanism (discharging head 2, carriage 3, and the like), and is arranged at a position where the drying device 10 faces a guide unit 9 configured to guide conveyance of the printing medium P. The guide unit 9 guides the printing medium P obliquely downward. The drying device 10 is a fixing device that promotes drying of ink and fixation to the printing medium P by blowing hot air to the printing medium P that bears ink discharged from the discharging head 2 and is conveyed on the guide unit 9.

The drying device 10 includes a hot air blowing unit 11 and a passage forming unit 14. The hot air blowing unit 11 is a mechanism that includes a blowing unit 12 configured to blow air, and a heating unit 13 configured to heat air blown from the blowing unit 12, and generates hot air. In the embodiment, the blowing unit 12 is an electric fan, and the heating unit 13 is a coil type electrothermal transducer.

The passage forming unit 14 is a member that forms, between the hot air blowing unit 11 and a region R on the conveyance path (on RT0) of the conveying unit 6, a circulation path RT1 through which air blown from the hot air blowing unit 11 is circulated. The region R is a section of part of the conveyance path RT0 demarcated by the guide unit 9, and is a section facing the bottom of the drying device 10. The passage forming unit 14 includes a chamber 14*a* that incorporates the hot air blowing unit 11 and demarcates an internal space SP, partitions 14*b* formed inside the chamber 14*a*, a blow-off plate 14*c*, and a cover member 14*d*. The blow-off plate 14*c* is a perforated plate in which many holes are formed. The circulation path RT1 is demarcated by the chamber 14*a*, the partitions 14*b*, and the surface of the guide unit 9. Air blown from the blowing unit 12 is circulated in the order of the heating unit 13→the blow-off plate 14*c*→the surface of the guide unit 9→the blowing unit 12.

The circulation path RT1 has an introduction portion RTi to which air outside the circulation path (outside RT1) is introduced, and an exhaust portion RTo from which air inside the circulation path (inside RT1) is exhausted. In other words, the chamber 14*a* forms, together with the guide unit 9, an airtight space excluding the introduction portion RTi and the exhaust portion RTo. The introduction portion RTi is an opening portion formed at the upstream end of the circulation path RT1 in the conveyance direction of the printing medium P. The exhaust portion RTo is an opening portion formed at the downstream end of the circulation path RT1 in the conveyance direction of the printing medium P.

Hot air is blown from the hot air blowing unit 11 through the blow-off plate 14*c* to the printing medium P conveyed on the guide unit 9. By blowing hot air toward the printing medium P, the temperatures of ink and the printing medium P rise, water and a solvent contained in the ink evaporate, and emulsion ink forms a film. Part of the hot air blown from the hot air blowing unit 11 forms a flow circulating through the circulation path RT1. Since the already heated hot air circulates, the power consumption of the heating unit 13 can be reduced.

The drying device 10 includes temperature sensors 15*a* and 15*b*. The temperature sensor 15*a* is arranged in the internal space SP, and especially on the downstream side of the heating unit 13 and the upstream side of the region R or blow-off plate 14*c* in the flow direction of the circulating flow within the circulation path RT1. The temperature sensor 15*a* can detect the temperature of hot air blown to the printing medium P. The temperature sensor 15*b* is arranged outside the circulation path RT1 (outside the chamber 14*a*). The temperature sensor 15*b* can detect the temperature of outside air around the drying device 10.

The drying device 10 includes an adjusting unit 16. The adjusting unit 16 adjusts the amount of air outside the circulation path RT1 (outside the chamber 14*a*) that is supplied to the blowing unit 12. The adjusting unit 16 according to the embodiment adjusts the exhaust amount of air inside the circulation path RT1 that is exhausted from the circulation path RT1. The flow rate of inside air exhausted from the exhaust portion RTo is substantially equal to that of outside air introduced from the introduction portion RTi. If the exhaust amount is increased, the introduction amount of outside air to the circulation path RT1 increases and the circulating air amount decreases. That is, the amount of outside air supplied to the blowing unit 12 increases. In contrast, if the exhaust amount is decreased, the introduction amount of outside air to the circulation path RT1 decreases, and the circulating air amount increases. That is, the amount of outside air supplied to the blowing unit 12 decreases.

In this way, the ratio between outside air flowing into the blowing unit 12 and inside air can be adjusted. The temperature of air flowing into the blowing unit 12 becomes relatively low at a high ratio of outside air, and relatively high at a low ratio of outside air. By adjustment by the adjusting unit 16, the temperature of air flowing into the blowing unit 12 can be controlled. While high-temperature hot air is blown to the printing medium P, the blowing unit 12 can be prevented from being exposed to heat equal to or higher than the specification temperature. This can prevent deterioration of the blowing unit 12 and shortening of the service life of the drying device 10.

The adjusting unit 16 according to the embodiment adjusts the exhaust amount by changing the opening amount of the exhaust portion RTo by the displacement of a movable member 16*a*. The movable member 16*a* is a plate-like flapper pivotally provided around a shaft CT in the X direction, and pivots by the driving force of an actuator (here, a motor) 16*c*.

The position of the movable member 16*a* is detected by a position detection sensor 16*d*. The position detection sensor 16*d* is, for example, a potentiometer or a rotary encoder that detects the pivot amount of the movable member 16*a*. The position of the movable member 16*a*, that is, the opening amount of the exhaust portion RTo can be controlled more accurately by controlling the actuator 16*c* based on the detection result of the position detection sensor 16*d*. It can also be controlled to decrease the temperature of hot air (decrease the heat generation amount of the heating unit 13) when a temperature of hot air set by the user is high, but the position detection sensor 16*d* detects that the opening amount of the exhaust portion RTo is small.

The position of the movable member 16*a* is held by a holding unit 16*b*. The holding unit 16*b* is a lock mechanism that locks the position of the movable member 16*a* so as not to unnecessarily displace it. The holding unit 16*b* is, for example, a torque limiter provided on the shaft CT. When the driving force of the actuator 16*c* exceeds a predetermined torque of the torque limiter, the movable member 16*a* pivots. Even if an external force smaller than the predetermined torque acts on the movable member 16*a*, the position of the movable member 16*a* is held. The holding unit 16*b* can continuously maintain the position of the movable member 16*a*, that is, the opening amount of the exhaust portion RTo.

The cover member 14*d* covers the exhaust portion RTo, and has an opening through which exhausted air passes. The cover member 14*d* can prevent entrance of dust or the like into the circulation path RT1. In the embodiment, the cover member 14*d* covers even the movable member 16*a*. The cover member 14*d* can protect the movable member 16*a*.

Figure 2A:
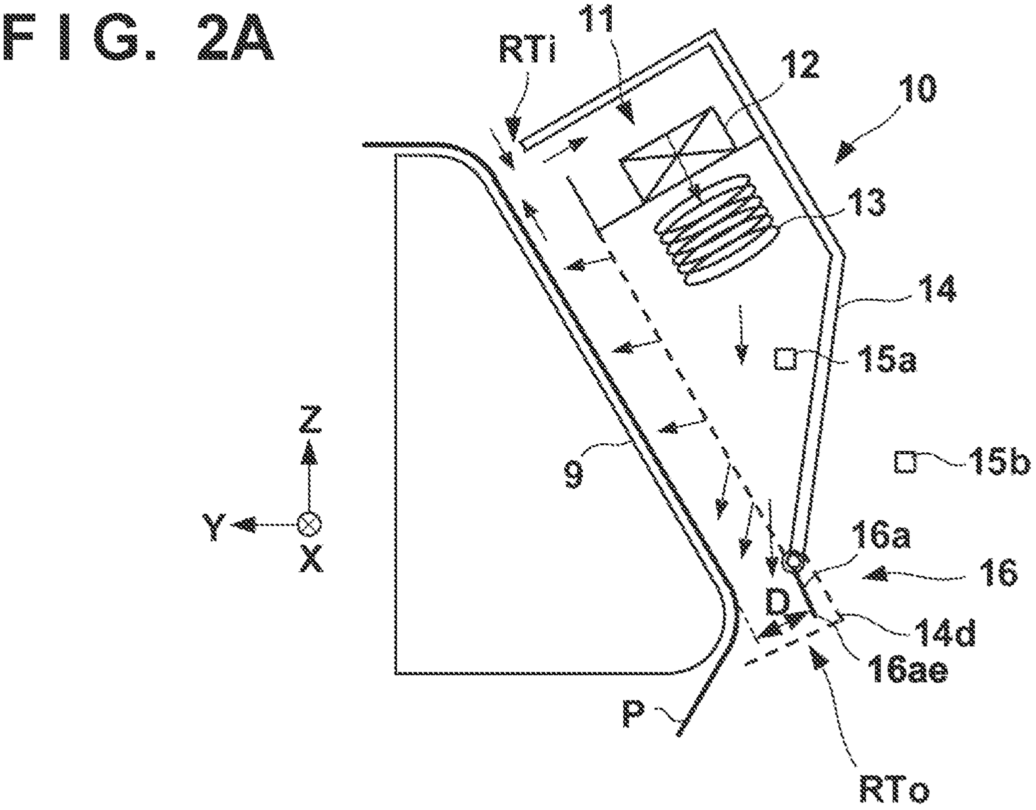
FIGS. 2A and 2B are views for explaining the operation of an adjusting unit.
Figure 2B:
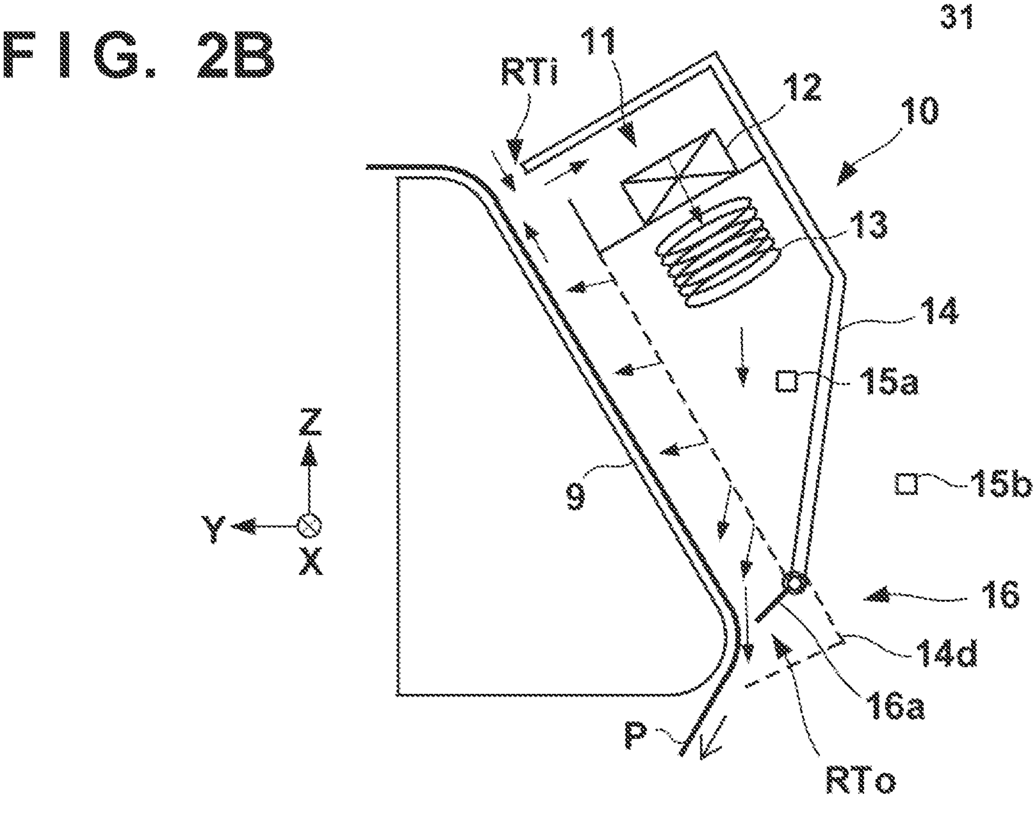

FIGS. 2A and 2B are views for explaining the operation of the adjusting unit 16. FIG. 2A shows a state in which the movable member 16*a* is fully open. In the embodiment, the distance between the guide unit 9 or the extended line of the guide unit 9, and a lower end 16*ae* of the movable member 16*a* is defined as an opening width D of the exhaust portion RTo. That is, a case in which the opening width D takes a maximum value Dmax set by a control unit 20 (see FIG. 3) is regarded as a state in which the movable member 16*a* is fully open. At this time, the opening ratio of the exhaust portion RTo is 100%. For example, when the maximum value Dmax=50 mm, and the lower end 16*ae* of the movable member 16*a* is located at a position where the opening width D=50 mm, the opening ratio is 100%. The maximum value Dmax of the opening width is properly set in accordance with various conditions such as the type of the printing medium P and the set temperature. Thus, a prospective posture of the movable member 16*a* when the movable member 16*a* is fully open is not limited to a posture substantially parallel to the extended line of the guide unit 9, as shown in FIG. 2A. For example, even if the posture of the movable member 16*a* is a posture positioned in a direction in which the lower end 16*ae* moves apart from the extended line of the guide unit 9, or a posture positioned in a direction in which the lower end 16*ae* comes close to the extended line of the guide unit 9, compared to FIG. 2A, the movable member 16*a* becomes fully open at the opening width D=the maximum value Dmax of the opening width. Note that the maximum value Dmax of the opening width may be set by the control unit 20 in accordance with a table stored in advance in the control unit 20, or by the user via an operation panel 311 or an external terminal 321.

For example, when the set temperature of hot air blown to the printing medium P is high, the movable member 16*a* is fully opened. The blowing unit 12 has a specification temperature determined by a bearing, grease, electric board, and the like used. The temperature of air flowing into the blowing unit 12 needs to be lower than the specification temperature of the blowing unit 12. If the set temperature of hot air blown to the printing medium P is high, the temperature of air flowing into the blowing unit 12 becomes high and close to the specification temperature because the temperature of circulating inside air is high. When the opening ratio of the exhaust portion RTo is high, as shown in FIG. 2A, the high-temperature inside air easily flows out, but the amount of outside air taken through the introduction portion RTi increases in proportion. As a result, the temperature of air flowing into the blowing unit 12 can become lower than the specification temperature of the fan.

FIG. 2B shows a state (initial state) in which the movable member 16*a* is fully closed. In the embodiment, the state in which the movable member 16*a* is fully closed is a case in which the opening ratio of the exhaust portion RTo is 20% to 30%. Similar to the case in which the movable member 16*a* is fully open, the opening ratio of the exhaust portion RTo in the state in which the movable member 16*a* is fully closed can also be properly set in accordance with various conditions such as the type of the printing medium P and the set temperature. It suffices to set the opening ratio to be higher than 0% and lower than 100%. To prevent the lower end 16*ae* of the movable member 16*a* from contacting the printing medium P conveyed on the guide unit 9, it is desirable that the opening ratio in the fully closed state does not become 0%.

For example, when the set temperature of hot air blown to the printing medium P is low, the movable member 16*a* is fully closed. If the set temperature of hot air blown to the printing medium P is low, the temperature of circulating inside air becomes low. Even if the ratio of inside air flowing into the blowing unit 12 is high, the temperature is lower than the specification temperature. When the opening ratio of the exhaust portion RTo is lower than 10%, as shown in FIG. 2B, the low-temperature inside air hardly flows out, but the amount of outside air taken through the introduction portion RTi decreases in proportion. As a result, the circulation rate of inside air can be increased to reduce the power consumption of the heating unit 13.

<Control Circuit>

Figure 3:
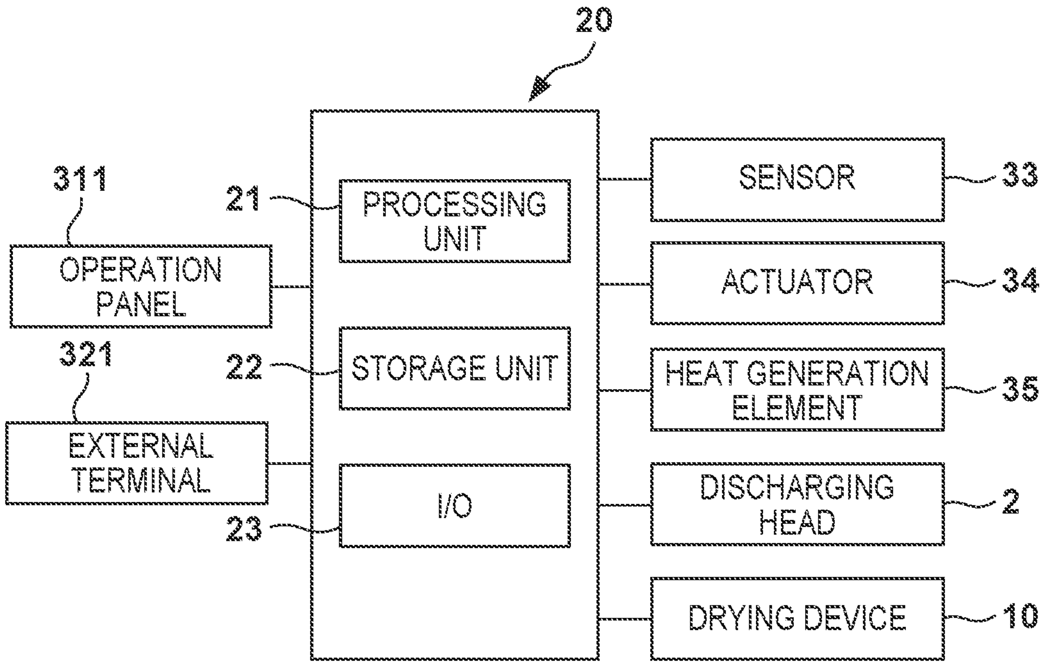
FIG. 3 is a block diagram of the control circuit of the printing apparatus in FIG. 1.

The arrangement of the control circuit of the printing apparatus 1 will be explained with reference to FIG. 3. The printing apparatus 1 includes the control unit 20 that controls the printing apparatus 1. The control unit 20 includes a processing unit 21, a storage unit 22, and an input/output interface (I/O) 23. The processing unit 21 is formed from one or more processors, and controls the printing apparatus 1 by executing a control program stored in the storage unit 22. More specifically, for example, the processing unit 21 obtains the detection result of a sensor 33 to perform driving control of an actuator 34, a heat generation element 35, the discharging head 2, and the drying device 10. The storage unit 22 is formed from one or more storage devices, and stores the control program and various data. The storage devices include semiconductor memories such as a RAM and a ROM, and a magnetic storage device such as a hard disk. The I/O 23 relays input/output of signals between the processing unit 21 and an external device.

The operation panel 311 is an input device that accepts an input from the user. The user can set a temperature and amount of hot air in the drying device 10 by inputting them to the operation panel 311. The temperature of hot air may be set by input of the user. Alternatively, temperature information of hot air that is determined in advance in accordance with the type of the printing medium P may be stored in the storage unit 22, and a temperature corresponding to the type of the printing medium P used may be read out from the temperature information and set. The external terminal 32 is a host computer such as a personal computer, and transmits to the control unit 20 an image or the like to be printed on the printing medium P by the printing apparatus 1.

The sensor 33 includes various sensors (for example, the position detection sensor of the carriage 3 and the rotation amount sensor of the driving roller 6*a*). The actuator 34 includes the motor 6*c*, the driving motor of the blowing unit 81, and the driving motor of the driving mechanism 5. The heat generation element 35 includes the heat generation element of the heating unit 82.

The sensors of the drying device 10 include the temperature sensors 15*a* and 15*b*, and the position detection sensor 16*d*. The actuators of the drying device 10 include the actuator (motor) 16*c*, the driving motor of the blowing unit 12, and the heat generation element of the heating unit 13.

<Control Example of Adjusting Unit>

Figure 4A:
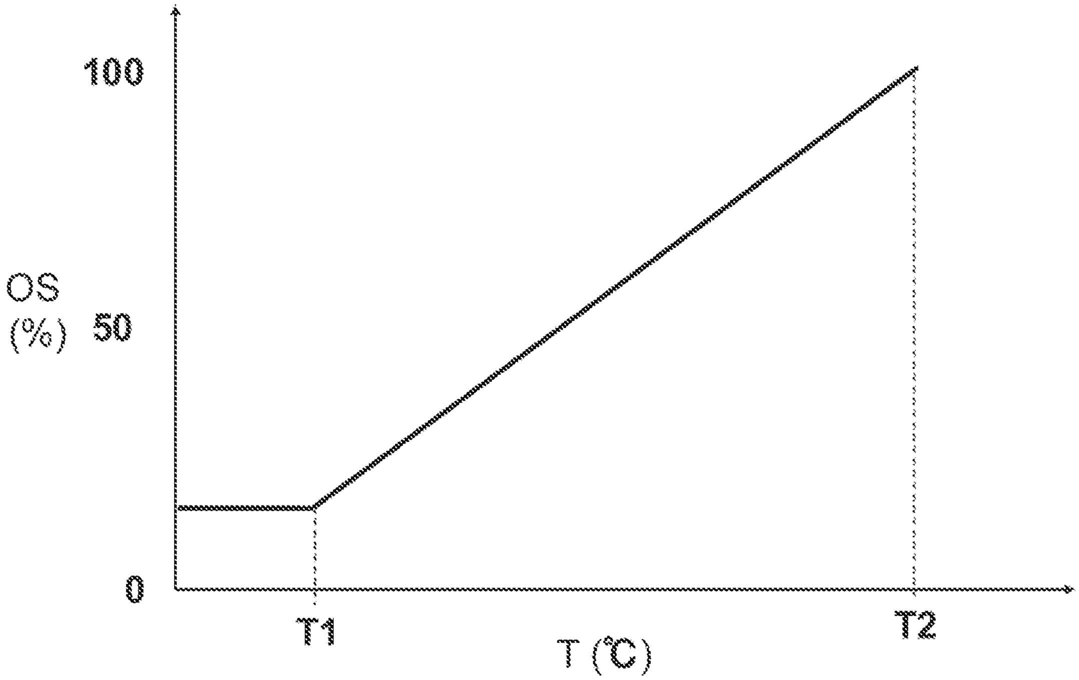
FIGS. 4A and 4B are graphs showing the relationship between the set temperature and the opening ratio.
Figure 4B:
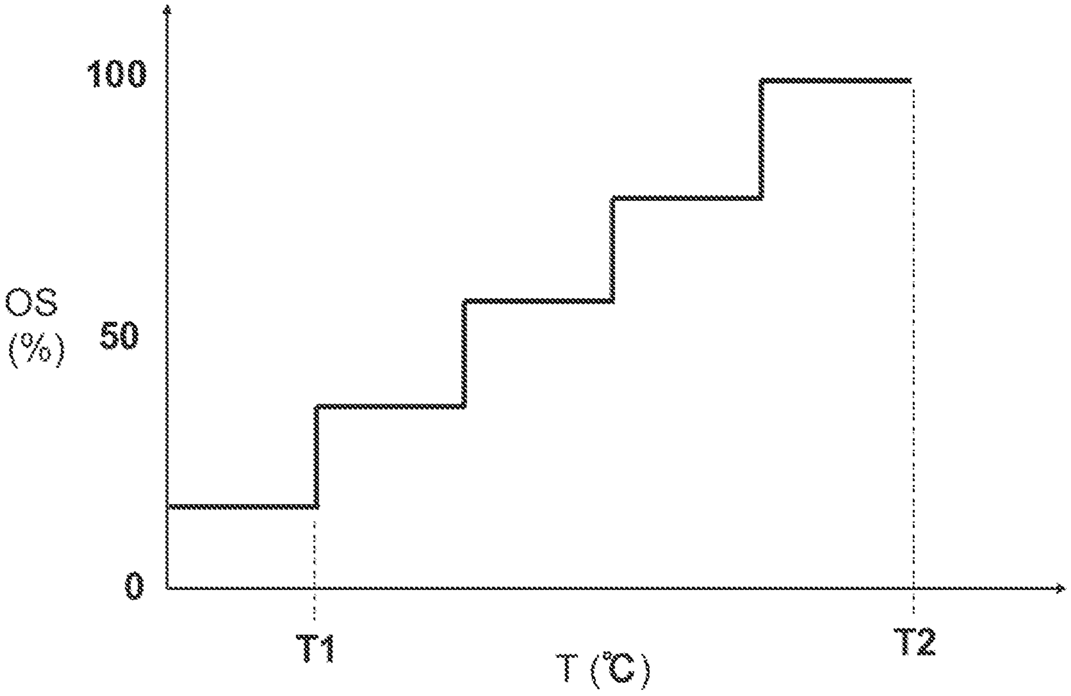

A control example of the adjusting unit 16 will be explained. FIGS. 4A and 4B show examples of the relationship between a set temperature T (abscissa) of hot air blown from the hot air blowing unit 11 to the printing medium P, and an opening ratio OS of the exhaust portion RTo. The position of the movable member 16*a* corresponds to the opening ratio OS. The adjusting unit 16 is controlled by the control unit 20.

FIG. 4A shows an example of the relationship when the opening ratio OS of the exhaust portion RTo is linearly controlled with respect to the set temperature of hot air. The opening ratio OS of the exhaust portion RTo is kept constant (initial state) till a set temperature T1 on the low temperature side, and at the set temperature T1 or higher, is gradually increased as the set temperature rises. At a set temperature T2 on the high temperature side, the opening ratio OS of the exhaust portion RTo becomes maximum (100%). In this fashion, the position of the movable member 16*a* is controlled.

FIG. 4B shows an example in which the position of the movable member 16*a* is controlled to change the opening ratio OS of the exhaust portion RTo stepwise with respect to the set temperature. The opening ratio OS of the exhaust portion RTo is kept in the initial state till the set temperature T1, and increased stepwise as the set temperature rises. At the set temperature T2, the opening ratio OS of the exhaust portion RTo becomes maximum. In this manner, the position of the movable member 16*a* is controlled.

The ratio between the circulating flow of hot air and outside air can be changed by controlling the opening ratio of the exhaust portion RTo by the adjusting unit 16 in accordance with the set temperature of hot air. When the temperature of hot air is high, the circulation rate can be decreased not to exceed the specification temperature of the blowing unit 12. When the temperature of hot air is low, the circulation rate can be increased to reduce the power consumption of the heating unit 13. The circulation rate of hot air can be properly changed in accordance with the temperature of hot air to be generated.

Figure 5:
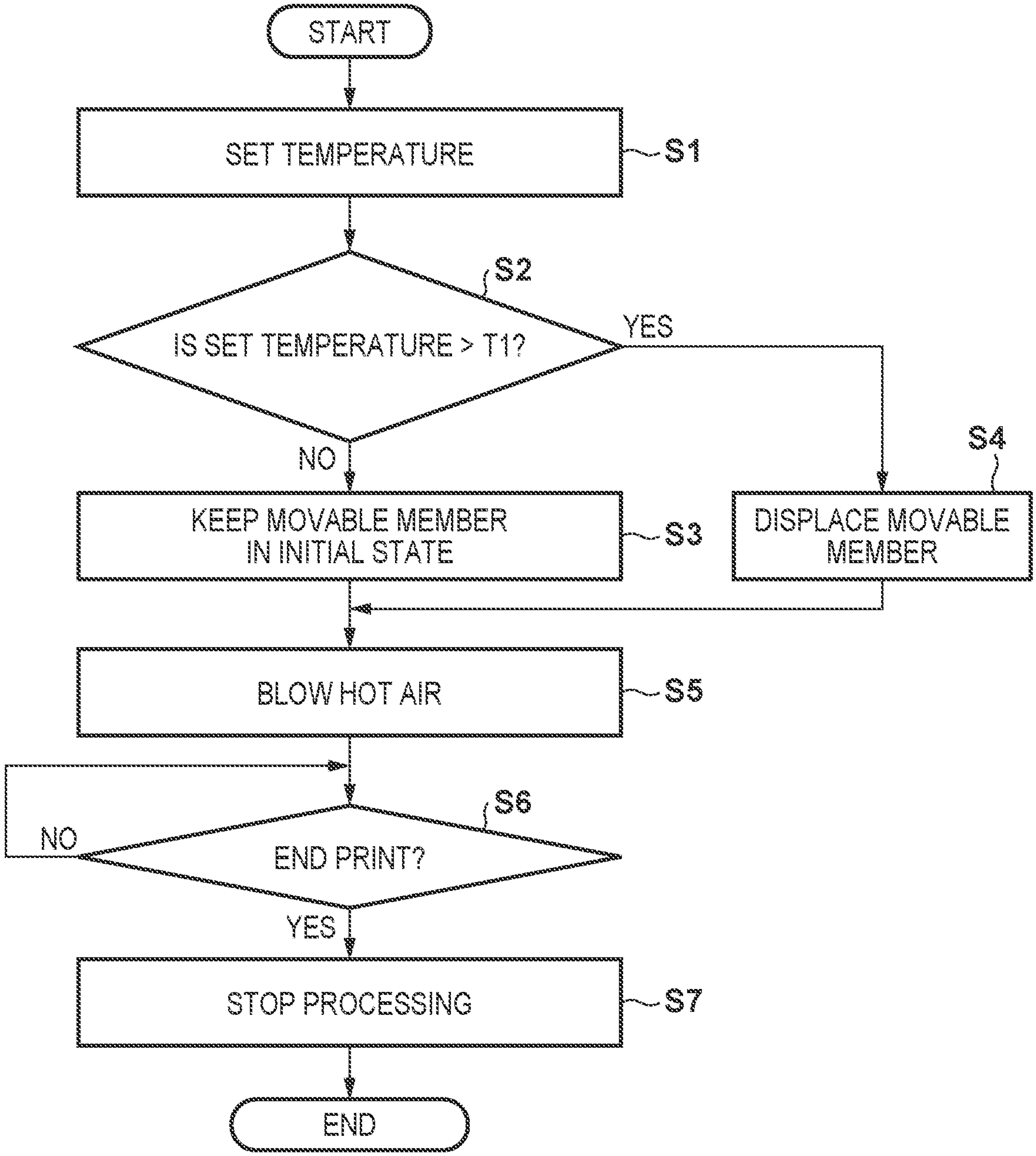
FIG. 5 is a flowchart showing a processing example of a control unit.

FIG. 5 is a flowchart showing a processing example of the control unit 20 regarding control of the drying device 10. The use of the relationship in FIG. 4A or 4B is assumed. In step S1, the temperature of hot air blown from the drying device 10 is set. The user can set the temperature of hot air by inputting it from the operation panel 311.

In step S2, it is determined whether the temperature of hot air set in step S1 exceeds the temperature T1. If the set temperature exceeds the temperature T1, the process advances to step S4. If the set temperature does not exceed the temperature T1, the process advances to step S3. In step S3, the position of the movable member 16*a* is set as an initial state. In step S4, the position of the movable member 16*a* is displaced in accordance with the set temperature. The relationship in FIG. 4A or 4B used in control may be corrected based on a temperature of outside air detected by the temperature sensor 15*b*. For example, when the temperature of outside air is low, the opening ratio of the exhaust portion RTo to the set temperature can be relatively decreased. To the contrary, when the temperature of outside air is high, the opening ratio of the exhaust portion RTo to the set temperature can be relatively increased.

In step S5, blowing of hot air by the hot air blowing unit 11 is started. Here, the blowing unit 12 is driven to supply power corresponding to the set temperature to the heating unit 13 and generate heat. The air amount (rotational speed of the motor) of the blowing unit 12 and the heat generation amount (supply power amount) of the heating unit 13 are controlled based on the difference between the detection result of the temperature sensor 15*a* and the set temperature, thereby maintaining hot air at the set temperature.

In step S6, it is determined whether execution of a print job sent to the printing apparatus 1 ends. If the execution of the print job does not end, blowing of hot air that has started in step S5 continues. If the execution of the print job ends, the process advances to step S7. In step S7, stop processing of the drying device 10 is executed. First, the heating unit 13 is turned off, and then the blowing unit 12 is also turned off. The position of the position detection sensor 16*d* is reset to the initial state. In the processing of step S7, if execution of a next print job is scheduled, it is also possible to decrease power supplied to the heating unit 13, then decrease the air blowing amount of the blowing unit 12, and wait for execution of the print job without completely stopping blowing of hot air and the like.

As described above, the adjusting unit 16 is controlled in accordance with a set temperature and a detected temperature. The ratio between outside air supplied to the blowing unit 12 and hot air can be changed to control the temperature so as not to exceed the specification temperature of the blowing unit 12. Both prevention of deterioration of the blowing unit 12 and reduction of power consumption can be achieved.

Second Embodiment

Figure 6A:
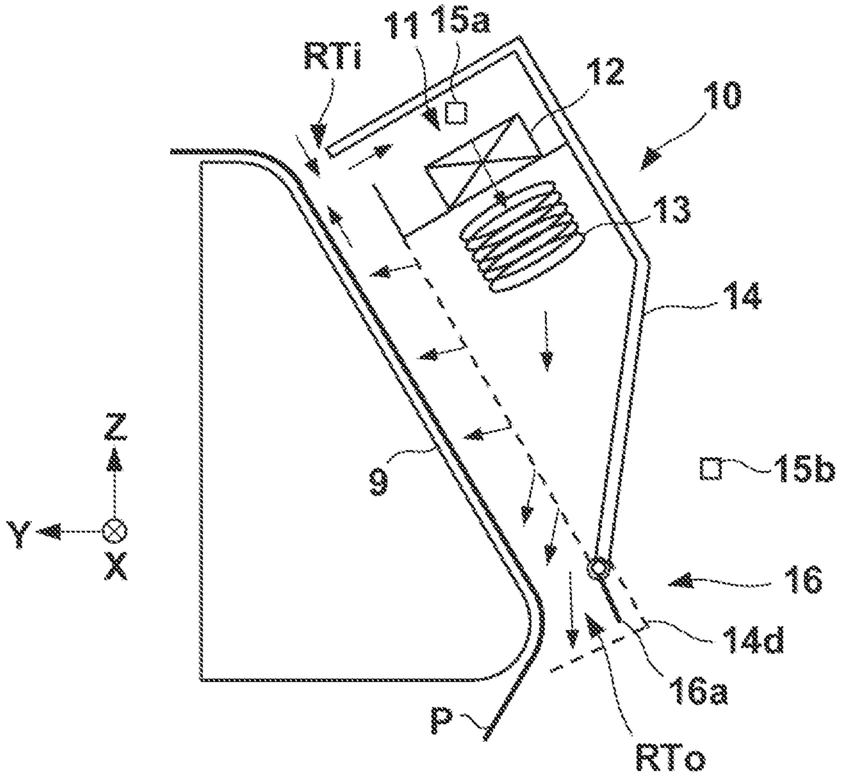
FIG. 6A is a view showing another arrangement example of a drying device.

In the first embodiment, the temperature sensor 15*a* is arranged on the downstream side of the heating unit 13 and the upstream side of the region R or the blow-off plate 14*c* in the flow direction of the circulating flow. However, the temperature sensor 15*a* may be arranged on the downstream side of the region R or the blow-off plate 14*c* and the upstream side of the blowing unit 12. FIG. 6A shows an example of this arrangement. In the example shown in FIG. 6A, a temperature sensor 15*a* detects the temperature of air supplied to a blowing unit 12.

Figure 6B:
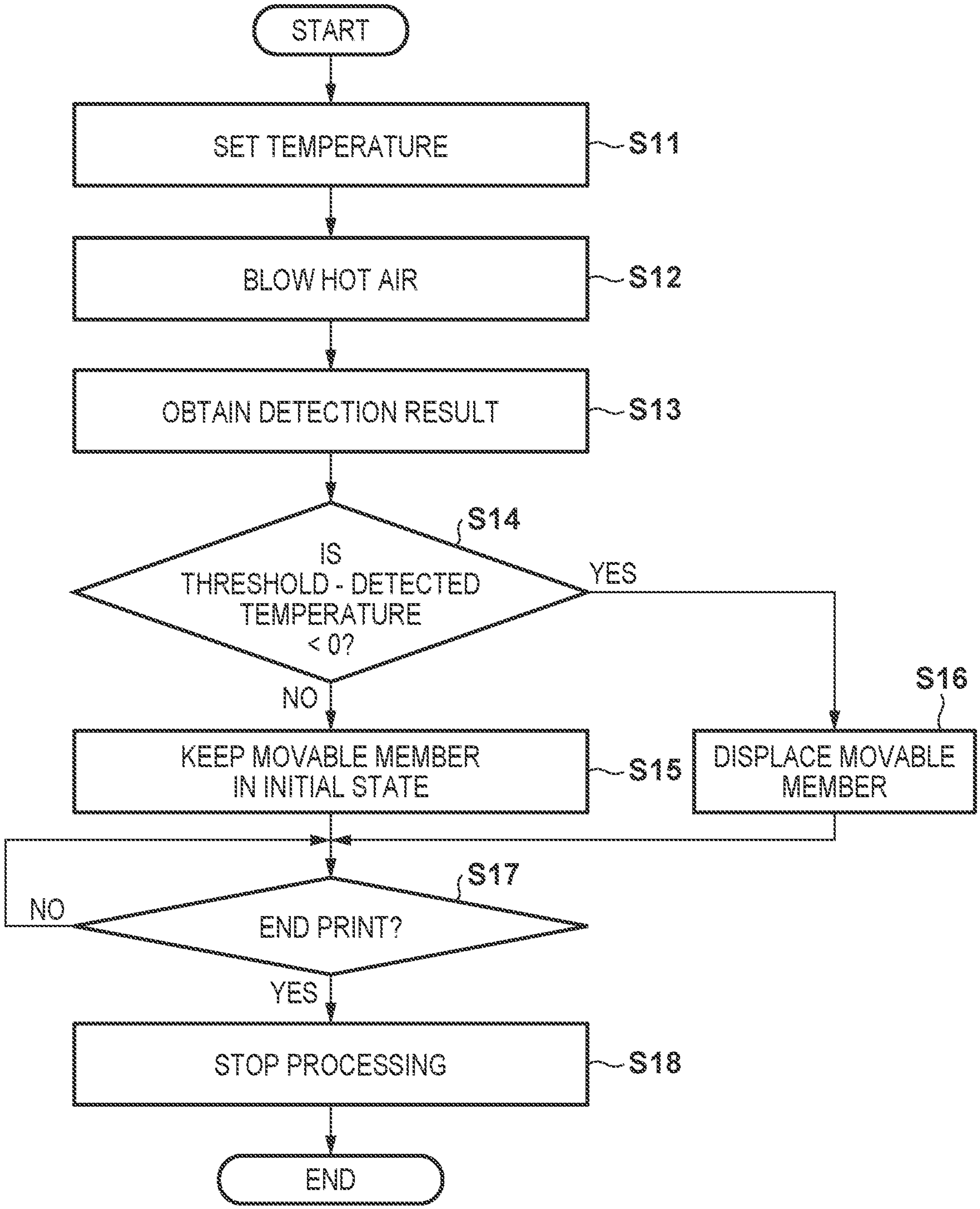
FIG. 6B is a flowchart showing a processing example of the control unit.

FIG. 6B is a flowchart showing an example of processing of a control unit 20 regarding control of a drying device 10 according to the embodiment. The displacement of a movable member 16*a* is controlled using the detection result of the temperature sensor 15*a* without using the relationship in FIG. 4A or 4B. In step S11, the temperature of hot air blown from the drying device 10 is set. The user can set the temperature of hot air by inputting it from an operation panel 311 and set it.

In step S12, a hot air blowing unit 11 starts blowing hot air. At this time, the blowing unit 12 is driven, and power corresponding to the set temperature is supplied to a heating unit 13 to generate heat. The air amount of the blowing unit 12 and the heat generation amount of the heating unit 13 may be corrected based on an outside air temperature detected by a temperature sensor 15*b*.

In step S13, the detection result of the temperature sensor 15*a* is obtained. In step S14, the difference between a threshold temperature and the detected temperature obtained in step S13 is calculated, and it is determined whether the difference is a negative value. The threshold temperature is set in consideration of the specification temperature of the blowing unit 12. If the difference is a negative value, the process advances to step S16; if the difference is not a negative value, to step S15. In step S15, the position of the movable member 16*a* is set as an initial state. In step S16, the position of the movable member 16*a* is displaced in accordance with the difference calculated in step S14.

In step S17, it is determined whether execution of a print job sent to a printing apparatus 1 ends. If execution of the print job does not end, blowing of hot air that has started in step S12 continues. If execution of the print job ends, the process advances to step S18. In step S18, stop processing of the drying device 10 is executed. The heating unit 13 is turned off first, and then the blowing unit 12 is also turned off. The position of the position detection sensor 16*d* is reset to the initial state. If execution of a next print job is scheduled in processing of step S18, it is also possible to decrease power supplied to the heating unit 13, then decrease the blowing amount of the blowing unit 12, and wait for execution of the print job without completely stopping blowing of hot air and the like.

As described above, the ratio between outside air supplied to the blowing unit 12 and hot air can be changed by controlling an adjusting unit 16 in accordance with a detected temperature. The temperature can be controlled not to exceed the specification temperature of the blowing unit 12. Both prevention of deterioration of the blowing unit 12 and reduction of power consumption can be achieved.

Third Embodiment

Figure 7:
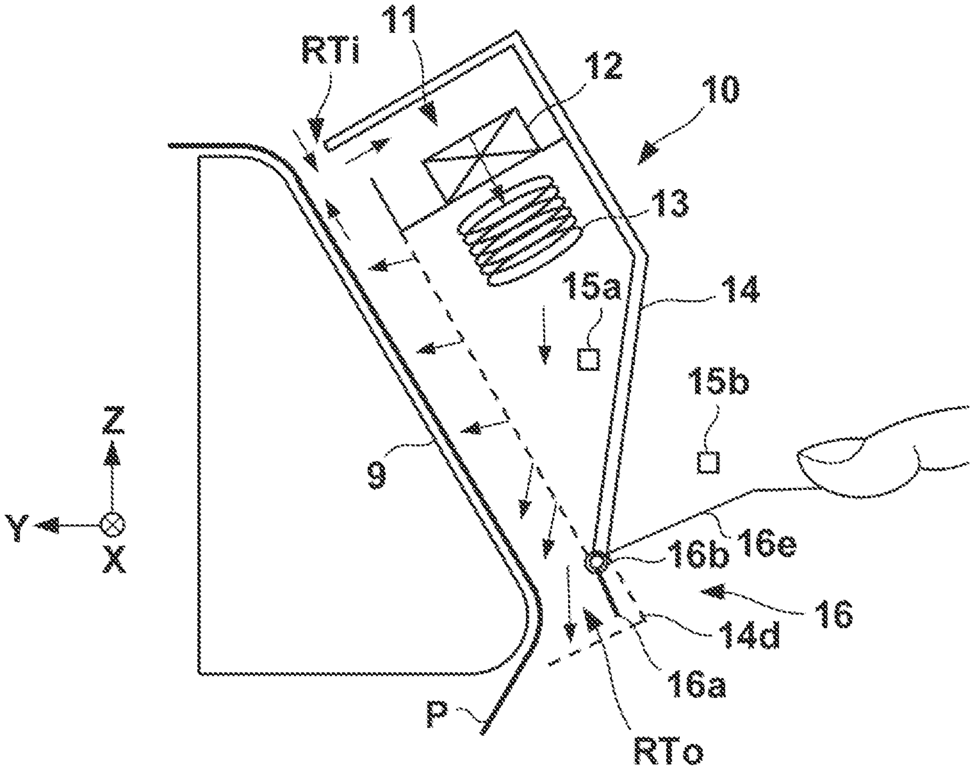
FIG. 7 is a view showing another arrangement example of the drying device.

The driving method of an adjusting unit 16 can be not electrical driving but manual driving. By manual driving, a printing apparatus can be manufactured at low cost, a motor or the like need not be provided, and a compact printing apparatus 1 can be implemented. FIG. 7 shows an example of this arrangement. In the example shown in FIG. 7, an operation member 16*e* is coupled to a movable member 16*a*, and the user can displace the movable member 16*a* by externally operating the operation member 16*e*. Neither an actuator 16*c* nor a sensor 16*d* is provided.

Note that both electrical driving and manual driving may be adopted as the driving method of the adjusting unit 16. In this case, the actuator 16*c* and the sensor 16*d* are provided in addition to the operation member 16*e*. Control of the adjusting unit 16 is basically automatic control, and the user may adjust the position of the movable member 16*a* by operating the operation member 16*e*, as needed.

Fourth Embodiment

Figure 8A:
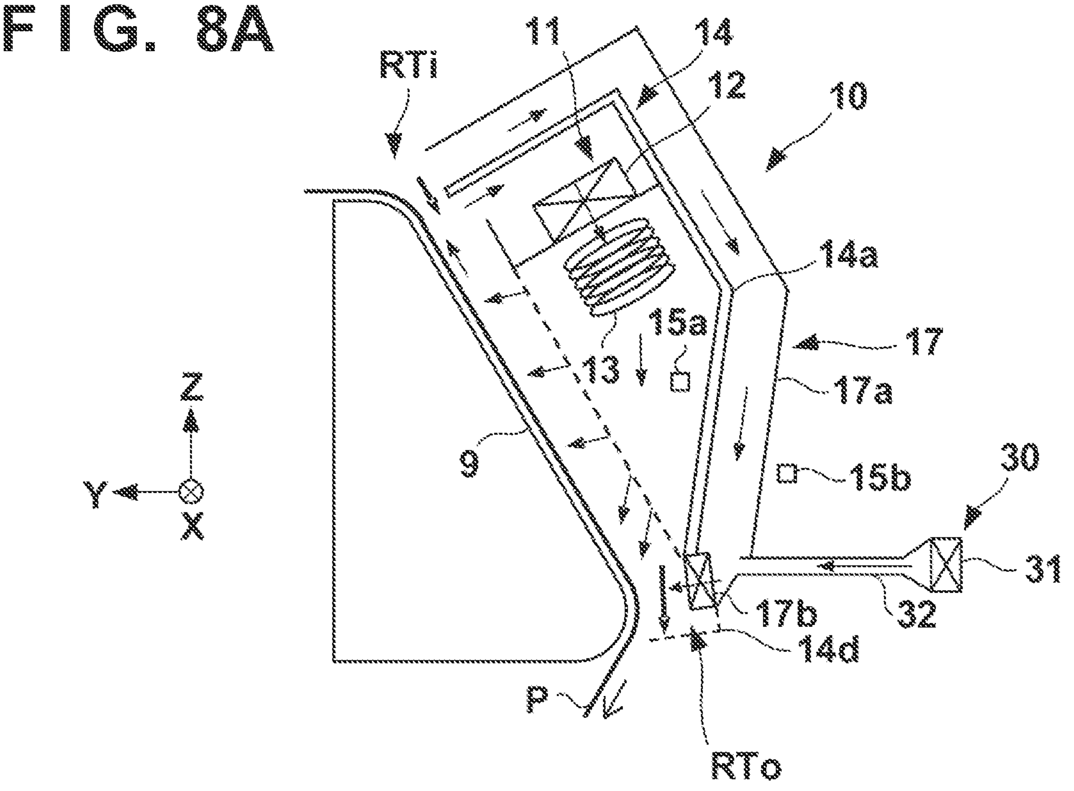
FIGS. 8A and 8B are views showing another arrangement example of the drying device.
Figure 8B:
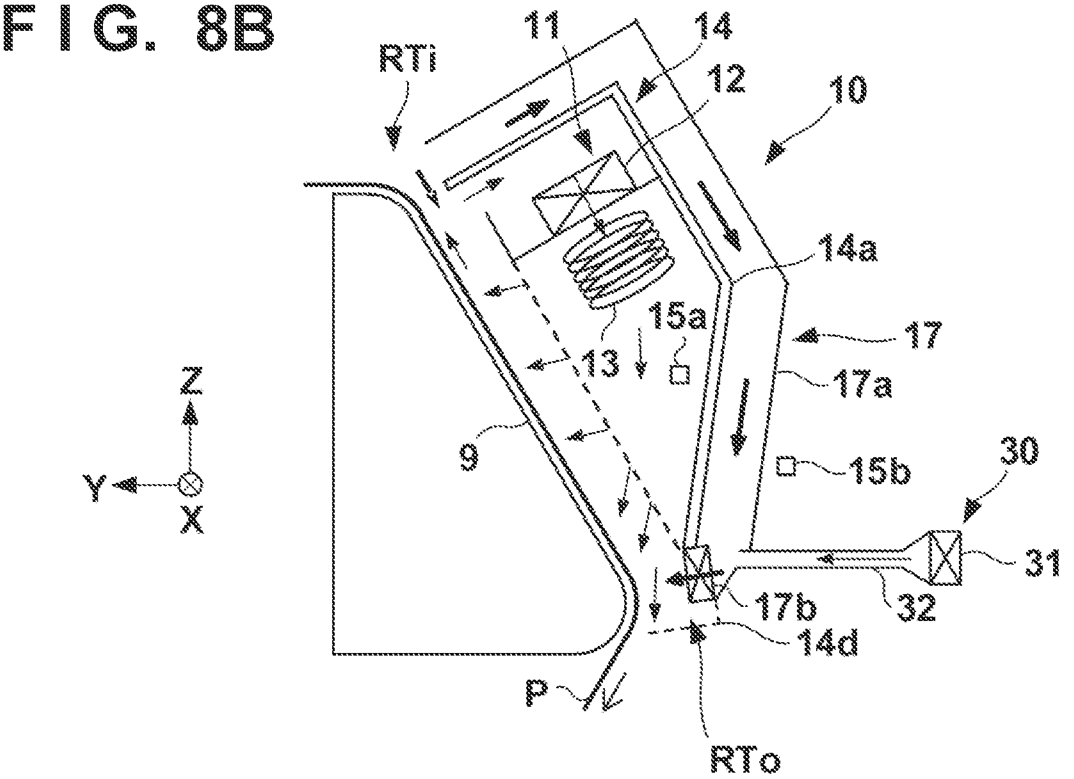

An adjusting unit 16 may be not a mechanism that changes the opening ratio of an exhaust portion RTo, like the first embodiment, but an external blowing mechanism that blows air at a position adjacent to the exhaust portion RTo. FIGS. 8A and 8B show an example of this arrangement.

In the embodiment, an adjusting unit 17 is provided instead of the adjusting unit 16. The adjusting unit 17 is an external blowing mechanism (downflow unit) including a passage forming unit 17*a* and a blowing unit 17*b*. The passage forming unit 17*a* forms an air path having an inlet open at a portion adjacent to an introduction portion RTi, and an outlet open at a portion adjacent to the exhaust portion RTo. The blowing unit 17*b* is an electric fan that is arranged inside the air path and especially near the outlet of the air path, and blows air to the vicinity of the exhaust portion RTo in the exhaust direction of the exhaust portion RTo. The blowing unit 17*b* is covered with a cover member 14*d*. The outlet of the passage forming unit 17*a* is open to face a guide unit 9, and air is blown from the blowing unit 17*b* toward the guide unit 9.

A drying device 10 includes a cooling unit 30 that cools the adjusting unit 17. The cooling unit 30 includes a blowing unit 31, and a duct 32 that guides air blown from the blowing unit 31 to the blowing unit 17*b*. Outside air can be blown by the blowing unit 31 to the blowing unit 17*b* to cool the blowing unit 17*b*. Temperature rise of the blowing unit 17*b* by hot air exhausted from the exhaust portion RTo can be suppressed not to exceed the specification temperature.

FIG. 8A shows a state in which the set temperature of hot air is high, and the flow rate of the blowing unit 17*b* is low in correspondence with this. Similar to the first embodiment, the temperature of air flowing into a blowing unit 12 needs to be lower than the specification temperature of the blowing unit 12. By decreasing the flow rate of the blowing unit 17*b*, hot air exhausted from the exhaust portion RTo pushes away a wind from the blowing unit 17*b* and is readily exhausted. As a result, the intake amount of outside air at the introduction portion RTi increases, and the temperature of air flowing into the blowing unit 12 can become lower than the specification temperature.

FIG. 8B shows a state in which the set temperature of hot air is low, and the flow rate of the blowing unit 17*b* is high in correspondence with this. When the set temperature of hot air is low and does not exceed the specification temperature of the blowing unit 12, the power consumption of a heating unit 13 can be reduced by increasing the circulation rate of hot air. Hot air exhausted from the exhaust portion RTo is hindered by a wind from the blowing unit 17*b* and is hardly exhausted. As a result, the intake amount of outside air at the introduction portion RTi decreases, and the circulation rate of hot air can be increased.

Figure 9A:
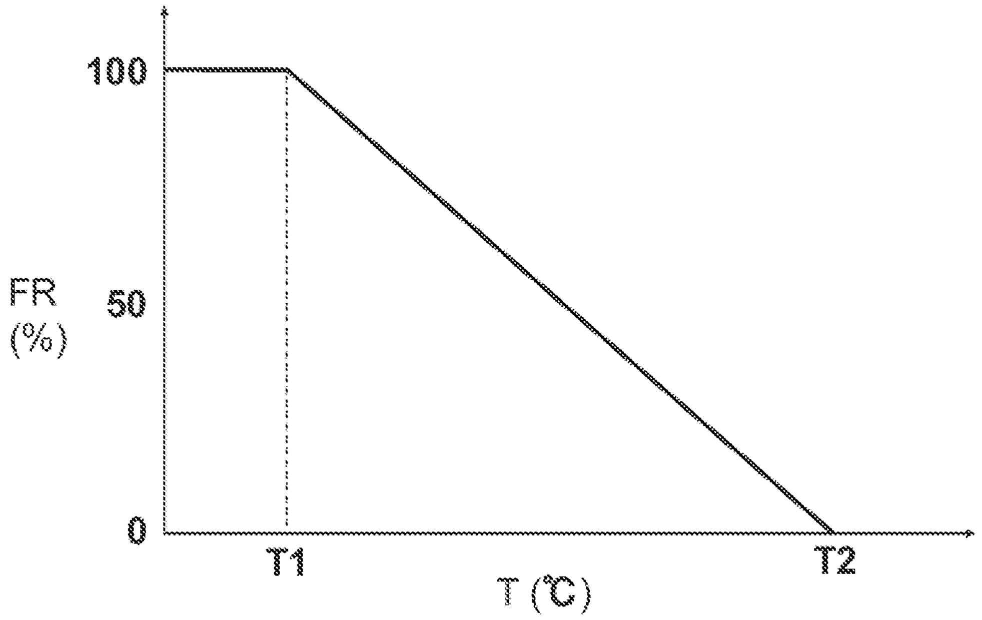
FIGS. 9A and 9B are graphs showing the relationship between the set temperature and the flow rate.
Figure 9B:
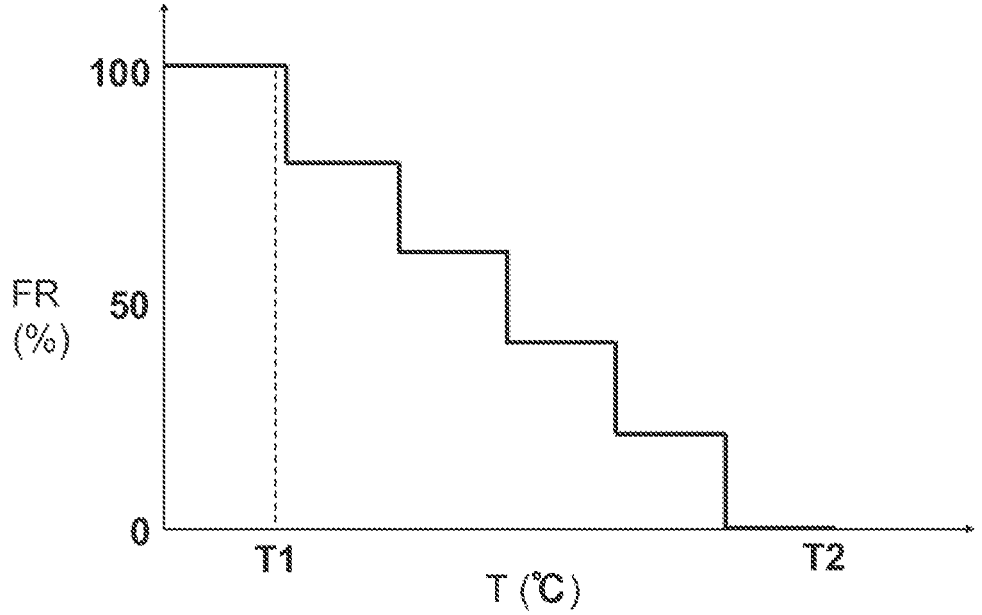

A control unit 20 can control the air amount of the blowing unit 17*b*. FIGS. 9A and 9B show examples of the relationship between a set temperature T (abscissa) of hot air blown from a hot air blowing unit 11 to a printing medium P, and a flow rate FR (maximum: 100%, minimum: 0%) of the blowing unit 17*b*.

FIG. 9A shows an example of the relationship when the flow rate is linearly controlled with respect to the set temperature of hot air. The flow rate is kept maximum (100%: initial state) till a set temperature T1 on the low temperature side, and at the set temperature T1 or higher, is gradually decreased as the set temperature rises. At a set temperature T2 on the high temperature side, the flow rate becomes minimum (0%).

FIG. 9B shows an example of the relationship when the flow rate is controlled stepwise with respect to the set temperature of hot air. The flow rate is kept maximum (100%: initial state) till the set temperature T1, and decreased stepwise as the set temperature rises. At the set temperature T2 on the high temperature side, the flow rate becomes minimum (0%).

The circulation rate of hot air can be changed by controlling the flow rate of the blowing unit 17*b* of the adjusting unit 17 in accordance with the set temperature of hot air. Accordingly, effects similar to those in the first embodiment can be obtained.

Figure 10:
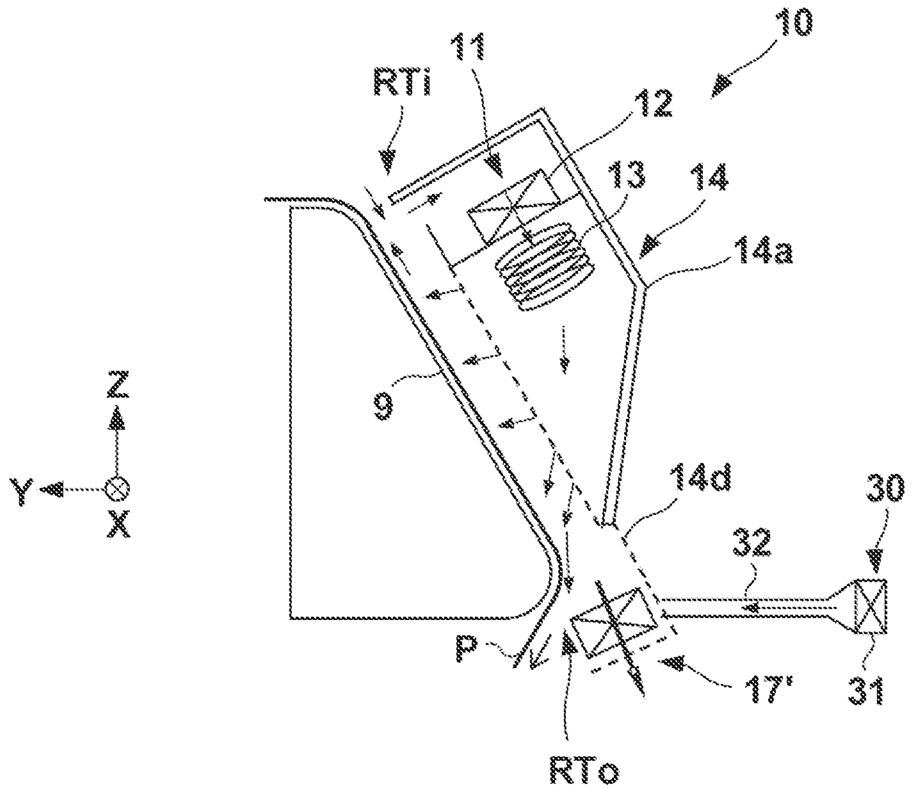
FIG. 10 is a view showing another arrangement example of the drying device.

An arrangement example in FIG. 10 can also be employed as an example of the external blowing mechanism that blows air in the exhaust direction of the exhaust portion RTo at a position adjacent to the exhaust portion RTo. An adjusting unit 17' is a blowing unit and an electric fan arranged on the downstream side of the exhaust portion RTo in the conveyance direction of the printing medium P, and is covered with the cover member 14*d*. In the example of FIG. 10, similar to the example of FIGS. 8A and 8B, the drying device 10 includes the cooling unit 30 that cools the adjusting unit 17'.

The exhaust direction of the adjusting unit 17' coincides with the exhaust direction of hot air from the exhaust portion RTo. When air is exhausted from the adjusting unit 17', a larger amount of hot air is exhausted from the exhaust portion RTo owing to the flow resistance, and a larger amount of outside air is taken into the introduction portion RTi.

The control unit 20 can control the flow rate of the adjusting unit 17'. The relationship between the set temperature of hot air and the flow rate of the adjusting unit 17' is reverse to that in the examples of FIGS. 9A and 9B. That is, the flow rate is kept minimum (0%: initial state) till the set temperature T1 on the low temperature side, and at the set temperature T1 or higher, is gradually increased as the set temperature rises. At the set temperature T2 on the high temperature side, the flow rate becomes maximum (100%).

Note that the adjusting units 17 and 17' according to the embodiment are configured to exhaust outside air. However, exhausted air may be, for example, air discharged from another place in a printing apparatus 1, or air (hot air) in an internal space SP. The lower limit of the flow rate of the adjusting units 17 and 17' is 0%, but may be a ratio higher than 0%. When the lower limit is a ratio higher than 0%, hot air can be continuously exhausted from the exhaust portion RTo to suppress generation of condensation in the drying device 10.

Fifth Embodiment

Figure 11A:
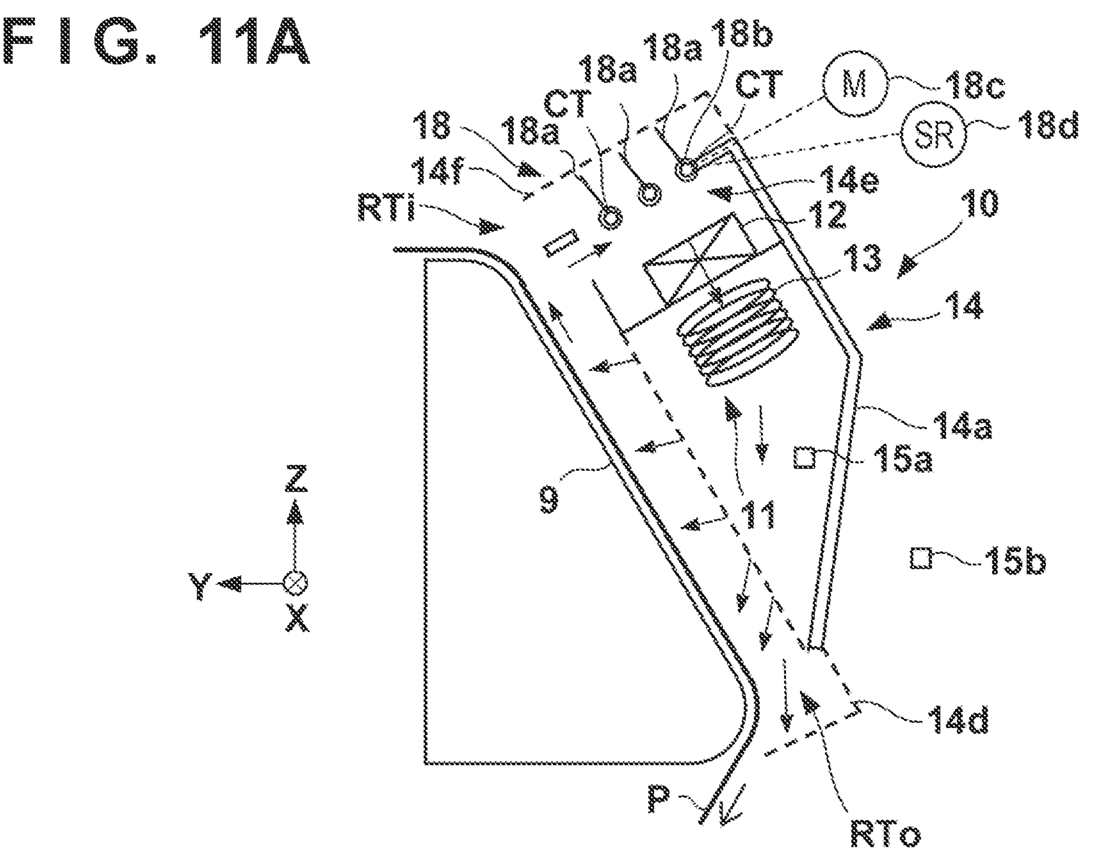
FIGS. 11A and 11B are views showing another arrangement example of the drying device.
Figure 11B:
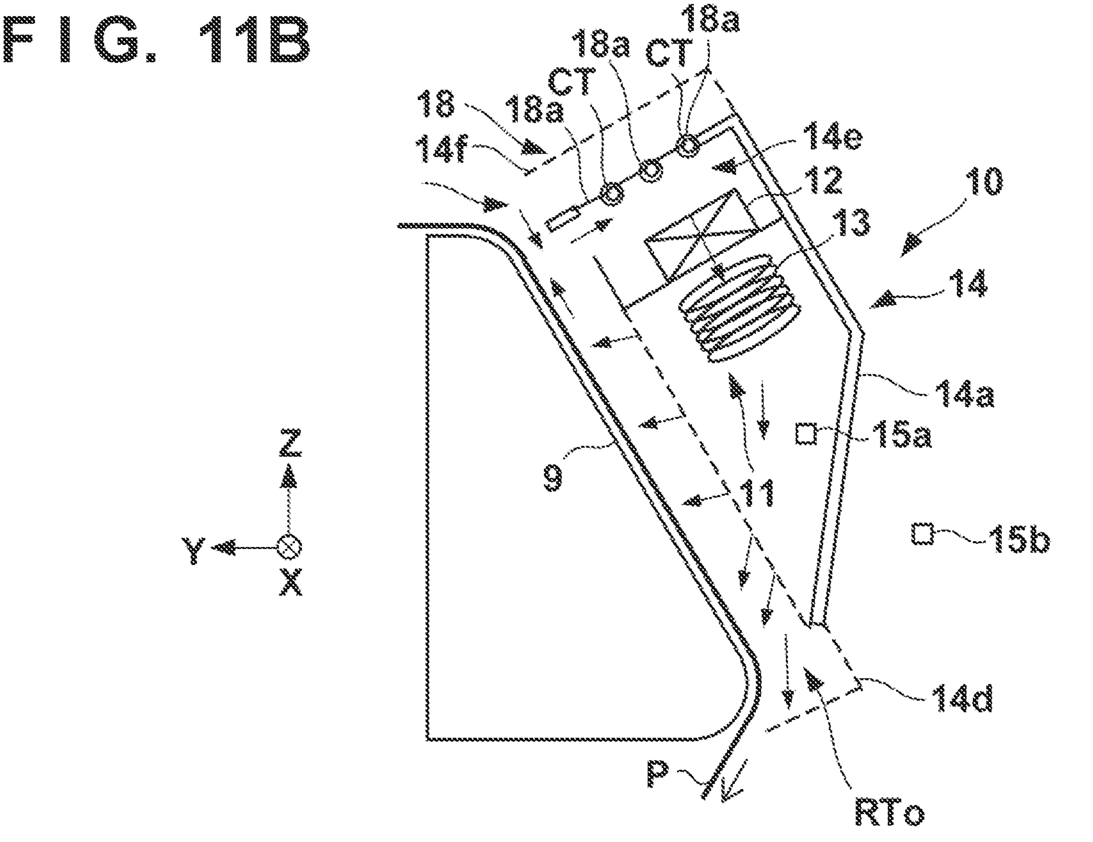

An adjusting unit may adjust the introduction amount of outside air to a circulation path RT1. FIGS. 11A and 11B show an example of this arrangement. In a passage forming unit 14 according to the embodiment, a chamber 14*a* has an opening portion 14*e*. The opening portion 14*e* is formed at an upstream-side portion of a blowing unit 12 on the downstream side of a region R or a blow-off plate 14*c* in the flow direction of a circulating flow. The opening portion 14*e* allows the circulation path RT1 to communicate with the outside.

An adjusting unit 18 includes movable members 18*a* that change the opening amount of the opening portion 14*e*. In the embodiment, a plurality of movable members 18*a* are provided and form a louver to open/close the opening portion 14*e*. Each movable member 18*a* is a plate-like flapper pivotally provided around a shaft CT in the X direction, and pivots by the driving force of an actuator (here, a motor) 18*c*. The position of the movable member 18*a* is detected by a position detection sensor 18*d*. The position detection sensor 18*d* is, for example, a potentiometer or a rotary encoder that detects the pivot amount of the movable member 18*a*. The position of the movable member 18*a*, that is, the opening amount of the opening portion 14*e* can be controlled more accurately by controlling the actuator 18*c* based on the detection result of the position detection sensor 18*d*. It can also be controlled to decrease the temperature of hot air (decrease the heat generation amount of a heating unit 13) when a temperature of hot air set by the user is high, but the position detection sensor 18*d* detects that the opening amount of the opening portion 14*e* is small.

The position of the movable member 18*a* is held by a holding unit 18*b*. The holding unit 18*b* is a lock mechanism that locks the position of the movable member 18*a* so as not to unnecessarily displace it. The holding unit 18*b* is, for example, a torque limiter provided on the shaft CT. When the driving force of the actuator 18*c* exceeds a predetermined torque of the torque limiter, the movable member 18*a* pivots. Even if an external force smaller than the predetermined torque acts on the movable member 18*a*, the position of the movable member 18*a* is held. The holding unit 18*b* can continuously maintain the position of the movable member 18*a*, that is, the opening amount of the opening portion 14*e*. The opening portion 14*e* is covered with a cover member 14*f* having an opening through which air can pass. The movable members 18*a* are also covered with the cover member 14*f*.

FIG. 11A shows a state in which each movable member 18*a* is fully open. In the embodiment, a state in which each movable member 18*a* is fully closed is defined as a reference, and a state in which each movable member 18*a* pivots by about a right angle (90°) From the fully closed state is defined as a fully open state. In the fully open state, the opening ratio of the opening portion 14*e* becomes 100%. Note that an angle at which each movable member 18*a* is fully open is properly set in accordance with various conditions such as the type of a printing medium P and the set temperature. For example, when the set temperature of hot air blown to the printing medium P is high, each movable member 18*a* is fully opened. When the opening ratio of the opening portion 14*e* is high, as shown in FIG. 11A, the amount of outside air flowing into the blowing unit 12 increases, and the temperature of air flowing into the blowing unit 12 can become lower than the specification temperature of the fan.

FIG. 11B shows a state (initial state) in which each movable member 18*a* is fully closed, and the opening ratio of the opening portion 14*e* is 0%. For example, when the set temperature of hot air blown to the printing medium P is low, each movable member 18*a* is fully closed. If the set temperature of hot air blown to the printing medium P is low, the temperature of circulating inside air becomes low. Even if the ratio of inside air flowing into the blowing unit 12 is high, the temperature is lower than the specification temperature. When the opening ratio of the opening portion 14*e* is lower than 100%, as shown in FIG. 11B, the circulation rate of inside air can be increased to reduce the power consumption of the heating unit 13.

Figure 12A:
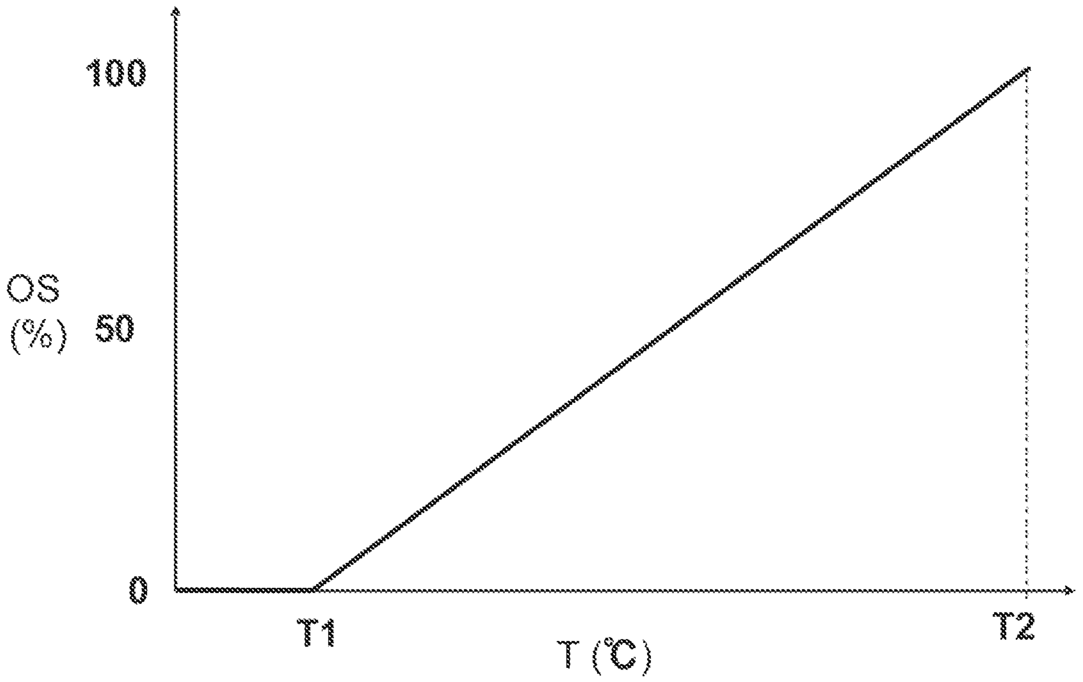
FIGS. 12A and 12B are graphs showing the relationship between the set temperature and the opening ratio.
Figure 12B:
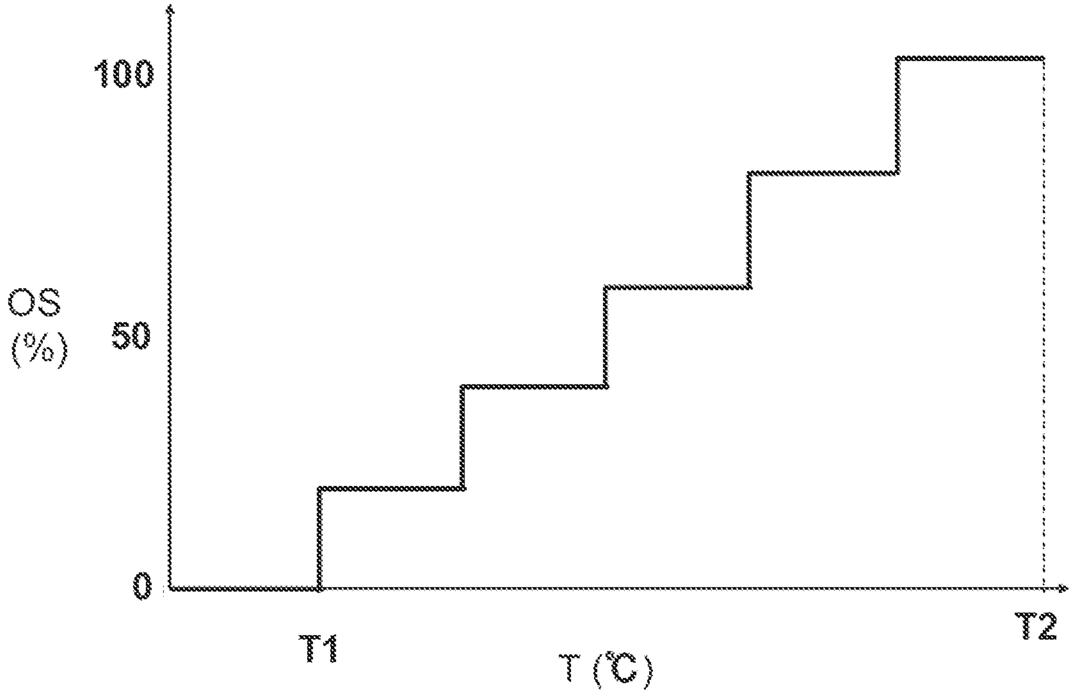

FIGS. 12A and 12B show examples of the relationship between a set temperature T (abscissa) of hot air blown from a hot air blowing unit 11 to the printing medium P, and an opening ratio OS of the opening portion 14*e*. The position of each movable member 18*a* corresponds to the opening ratio OS.

FIG. 12A shows an example of the relationship when the opening ratio OS of the opening portion 14*e* is linearly controlled with respect to the set temperature of hot air. The opening ratio OS of the opening portion 14*e* is kept constant (initial state) till a set temperature T1 on the low temperature side, and at the set temperature T1 or higher, is gradually increased as the set temperature rises. At a set temperature T2 on the high temperature side, the opening ratio OS of the opening portion 14*e* becomes maximum (100%). In this way, the position of the movable member 18*a* is controlled. The opening ratio OS till the set temperature T1 on the low temperature side may not be 0%, and can be properly set at a ratio between 0% (inclusive) to 100% (exclusive) in accordance with various conditions such as the type of the printing medium P and the set temperature.

FIG. 12B shows an example in which the position of each movable member 18*a* is controlled to change the opening ratio OS of the opening portion 14*e* stepwise with respect to the set temperature. The opening ratio OS of the opening portion 14*e* is kept in the initial state till the set temperature T1, and increased stepwise as the set temperature rises. At the set temperature T2, the opening ratio OS of the opening portion 14*e* becomes maximum. In this manner, the position of each movable member 18*a* is controlled.

The ratio between the circulating flow of hot air and outside air can be changed by controlling the opening ratio OS of the opening portion 14*e* by the adjusting unit 18 in accordance with the set temperature of hot air. When the temperature of hot air is high, the circulation rate can be decreased not to exceed the specification temperature of the blowing unit 12. When the temperature of hot air is low, the circulation rate can be increased to reduce the power consumption of the heating unit 13. The circulation rate of hot air can be properly changed in accordance with the temperature of hot air to be generated.

Even in the fifth embodiment, similar to the second embodiment, the movable member 18*a* may be manually displaced.

Although the opening portion 14*e* other than the introduction portion RTi is opened/closed in the embodiment, the introduction portion RTi may be opened/closed. In this case, the area of the flow channel of the introduction portion RTi may be adjusted by a valve or the like.

Sixth Embodiment

Figure 13A:
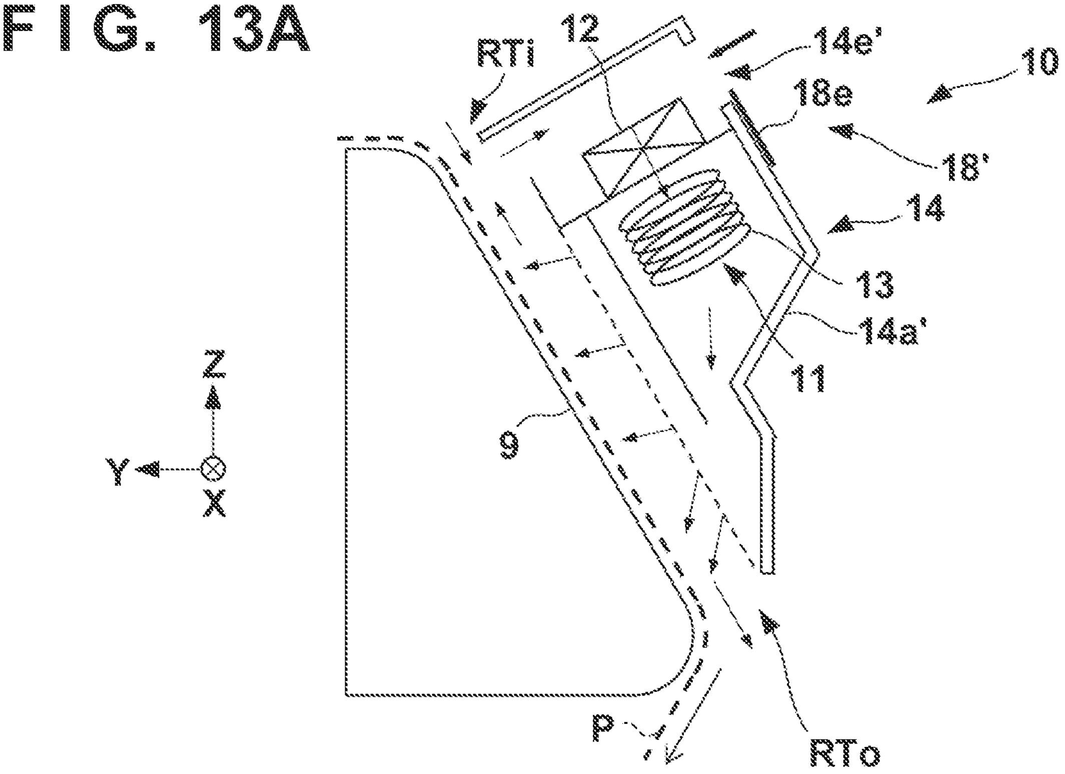
FIGS. 13A and 13B are views showing another arrangement example of the drying device.
Figure 13B:
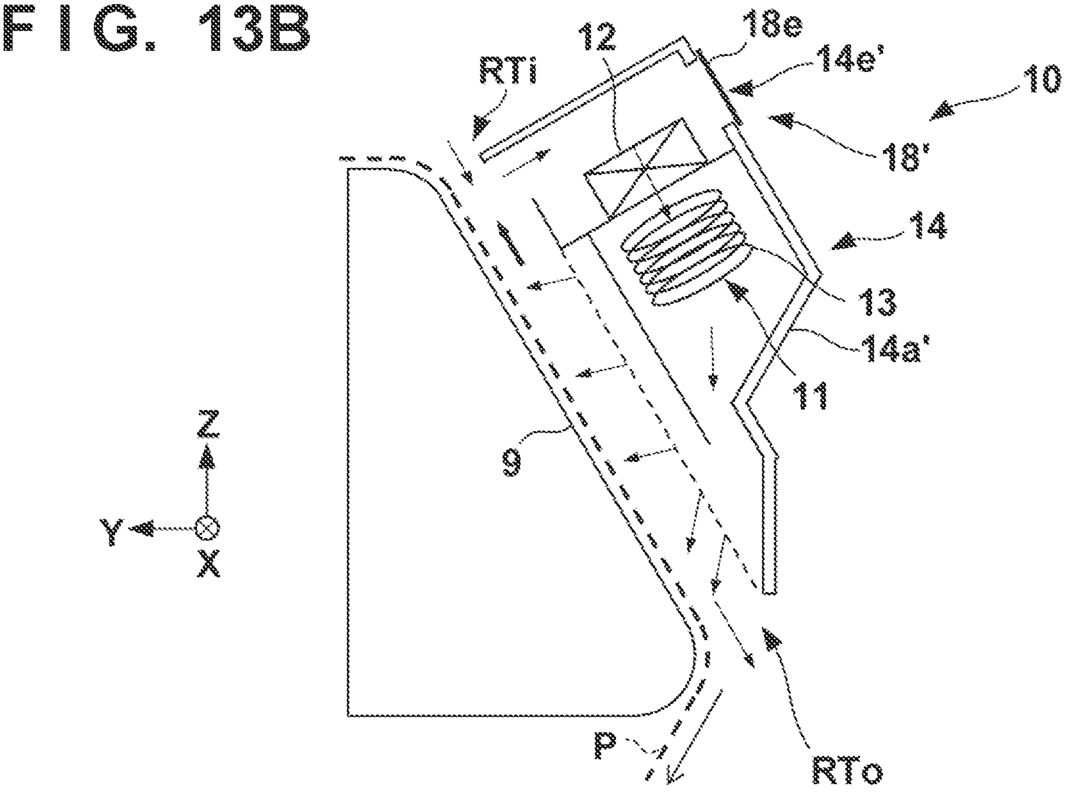

The movable members 16*a* and 18*a* are displaced by pivoting in the first and fifth embodiments, but may be displaced by linear motion. FIGS. 13A and 13B show an example of this arrangement. In a passage forming unit 14 according to the embodiment, a chamber 14*a* has an opening portion 14*e*'. The opening portion 14*e*' is formed at an upstream-side portion of a blowing unit 12 on the downstream side of a region R or a blow-off plate 14*c* in the flow direction of a circulating flow. The opening portion 14*e*' allows a circulation path RT1 to communicate with the outside.

An adjusting unit 18' includes a movable member 18*e* that changes the opening amount of the opening portion 14*e*'. The movable member 18*e* is a plate-like member provided to be translatable, and forms a shutter to open/close the opening portion 14*e*'. The movable member 18*e* may be displaced by an actuator such as a motor, and a sensor that detects the position of the movable member 18*e* may be provided.

FIG. 13A shows a state in which the movable member 18*e* is fully open. For example, when the set temperature of hot air blown to a printing medium P is high, the movable member 18*e* is fully opened. When the opening ratio of the opening portion 14*e*' is high, the amount of outside air flowing into the blowing unit 12 increases, and the temperature of air flowing into the blowing unit 12 can become lower than the specification temperature of the fan.

FIG. 13B shows a state in which the movable member 18*e* is fully closed. For example, when the set temperature of hot air blown to the printing medium P is low, the movable member 18*e* is fully closed. If the set temperature of hot air blown to the printing medium P is low, the temperature of circulating inside air becomes low. Even if the ratio of inside air flowing into the blowing unit 12 is high, the temperature is lower than the specification temperature. When the opening ratio of the opening portion 14*e*' is lower than the full open ratio, as shown in FIG. 13B, the circulation rate of inside air can be increased to reduce the power consumption of a heating unit 13.

Even in the sixth embodiment, similar to the second embodiment, the movable member 18*e* may be manually displaced. Also, a holding unit that holds the position of the movable member 18*e* may be provided. A movable member that is displaced by linear motion, as in the sixth embodiment, may be adopted as a movable member that adjusts the exhaust amount of an exhaust portion RTo, as in the first embodiment.

Seventh Embodiment

Figure 14A:
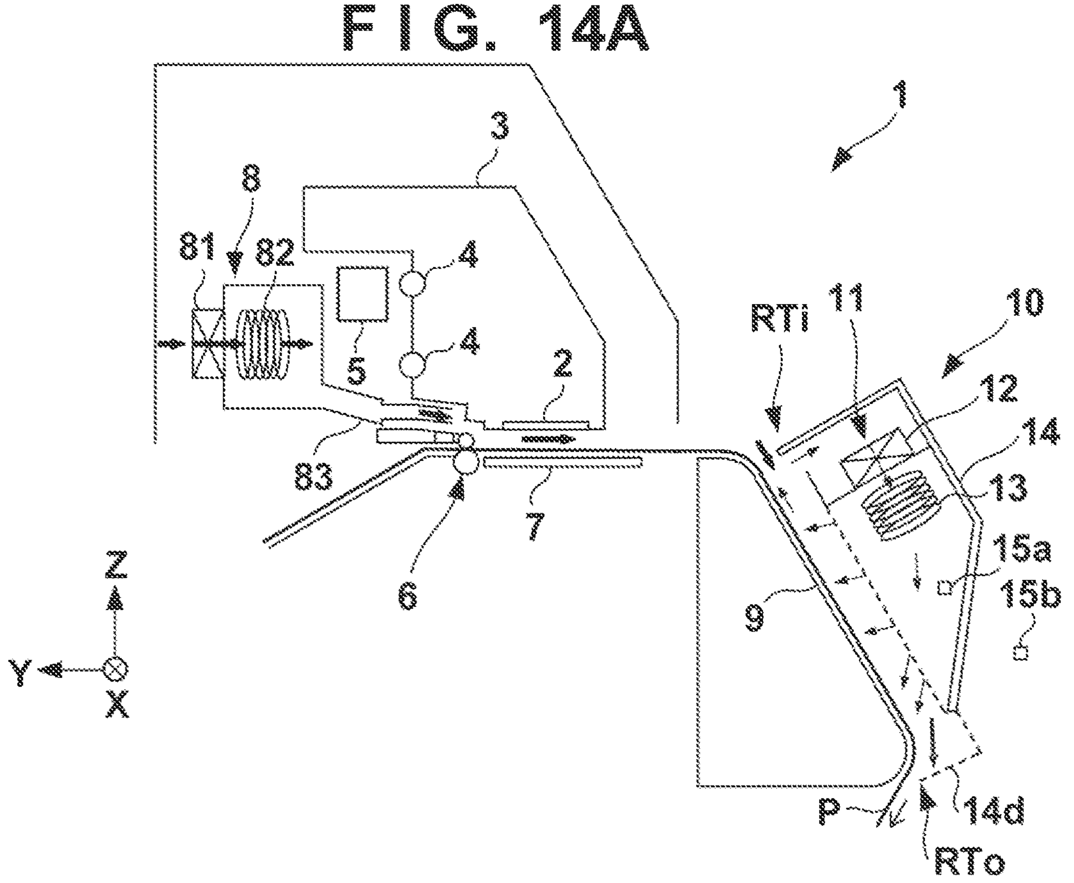
FIGS. 14A and 14B are views showing another arrangement example of the drying device.
Figure 14B:
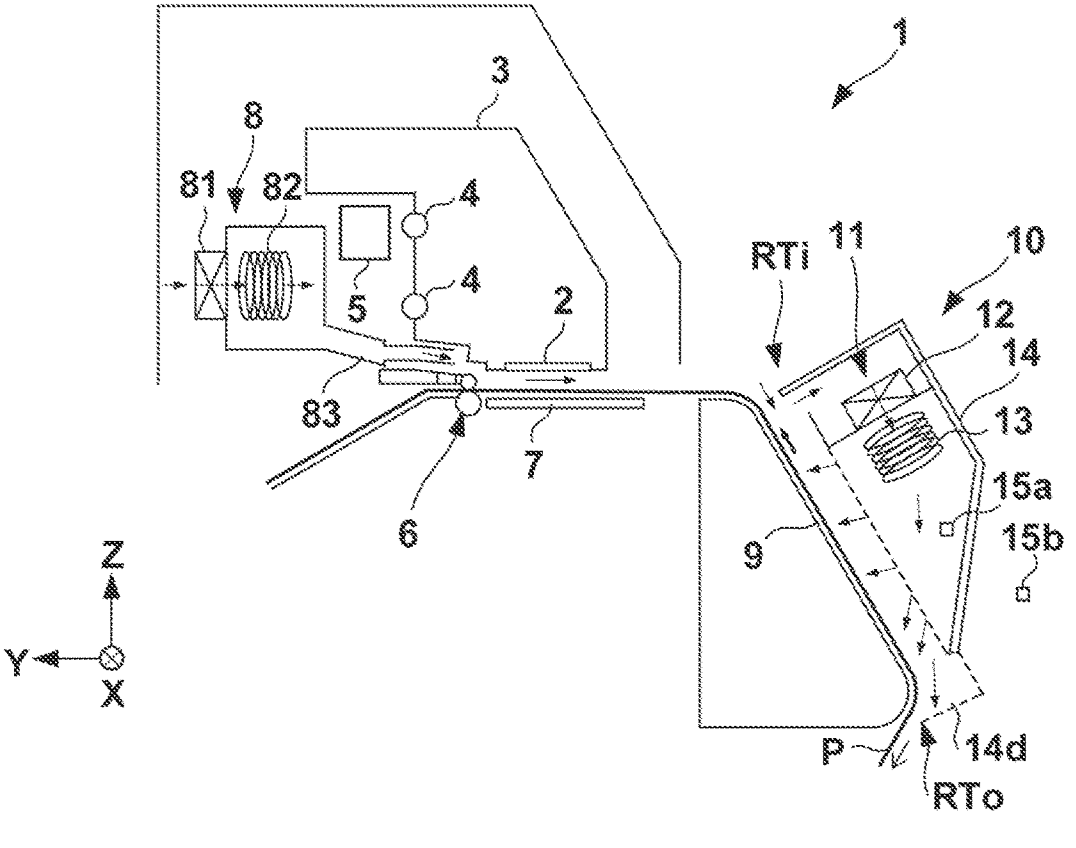

A hot air blowing device 8 may also be used as the adjusting unit of a drying device 10. FIGS. 14A and 14B are views for explaining this arrangement. When a blowing unit 81 of the hot air blowing device 8 is driven, blown air passes through a platen 7 and a discharging head 2 and reaches an introduction portion RTi. That is, the blowing unit 81 can be used as an external blowing unit that blows air toward the introduction portion RTi. At this time, the heat generation amount of a heating unit 82 as an external heating unit can be adjusted to adjust the temperature of air blown to the introduction portion RTi.

FIG. 14A shows an operation when the set temperature of hot air of the drying device 10 is high. The ratio of outside air flowing into a blowing unit 12 can be increased by blowing air from the blowing unit 81 of the hot air blowing device 8 to the introduction portion RTi. At this time, the heating unit 82 may stop heat generation. The temperature of air flowing into the blowing unit 12 can become lower than the specification temperature.

FIG. 14B shows an operation when the set temperature of hot air of the drying device 10 is low. The flow rate of air blown from the blowing unit 81 of the hot air blowing device 8 to the introduction portion RTi is decreased. The intake amount of outside air at the introduction portion RTi decreases, the amount of inside air exhausted from the exhaust portion RTo decreases, and the circulation rate of inside air increases. Thus, the power consumption of a heating unit 13 can be reduced.

Figure 15A:
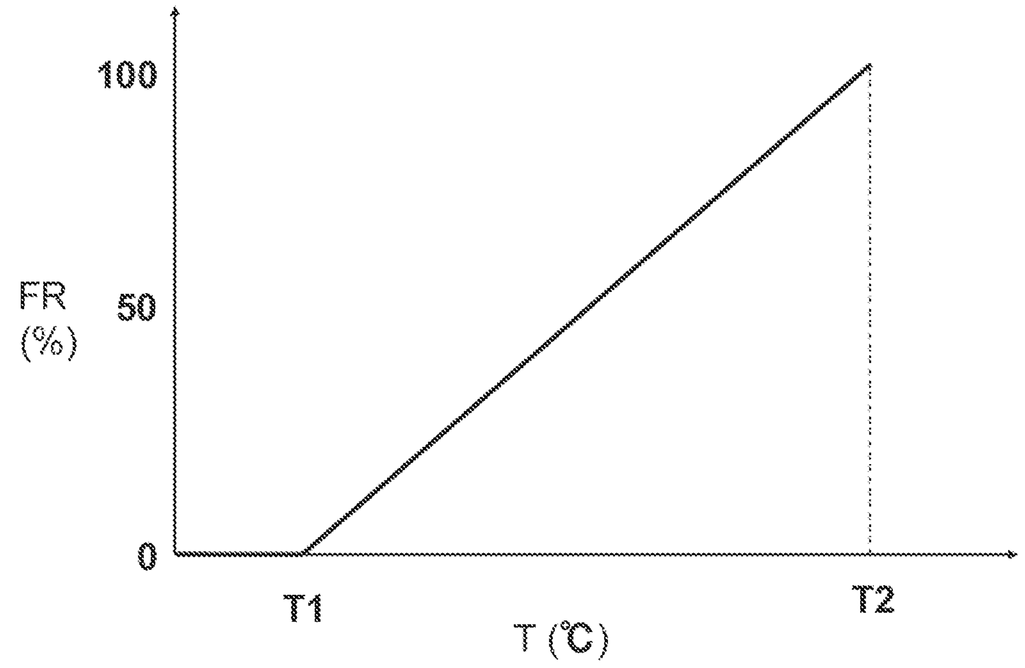
FIGS. 15A and 15B are graphs showing the relationship between the set temperature and the flow rate.
Figure 15B:
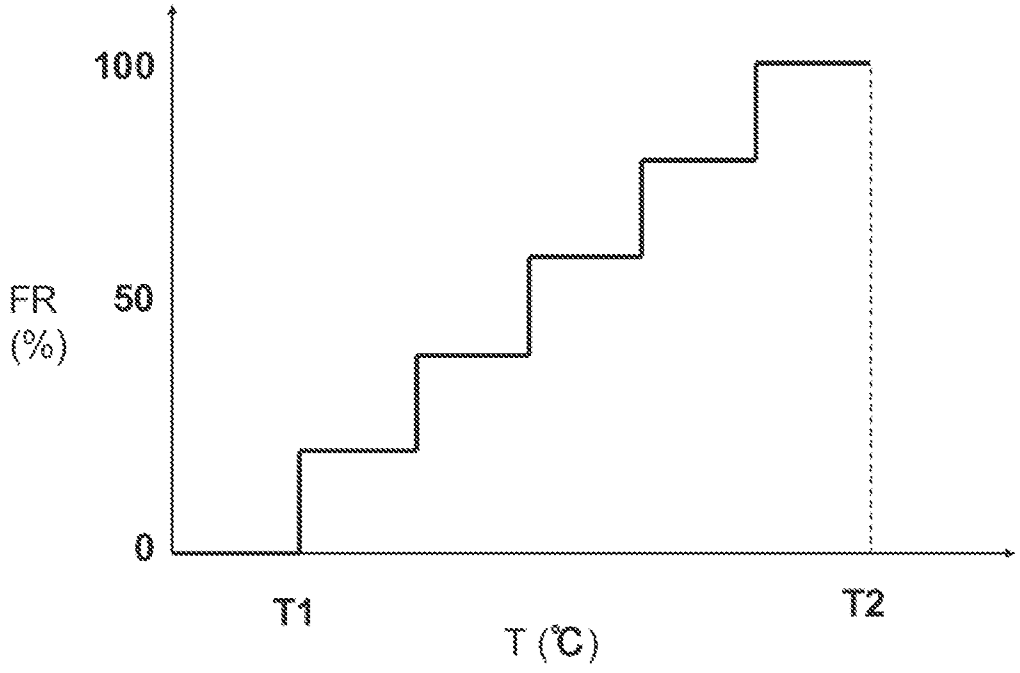

A control unit 20 can control the blowing unit 81 and the heating unit 82. FIGS. 15A and 15B show examples of the relationship between a set temperature T (abscissa) of hot air blown from a hot air blowing unit 11 to a printing medium P, and a flow rate FR (maximum: 100%, minimum: 0%) of the blowing unit 81.

FIG. 15A shows an example of the relationship when the flow rate is linearly controlled with respect to the set temperature of hot air. The flow rate is kept minimum (0%: initial state) till a set temperature T1 on the low temperature side, and at the set temperature T1 or higher, is gradually increased as the set temperature rises. At a set temperature T2 on the high temperature side, the flow rate becomes maximum (100%).

FIG. 15B shows an example of the relationship when the flow rate is controlled stepwise with respect to the set temperature of hot air. The flow rate is kept minimum (0%: initial state) till the set temperature T1, and increased stepwise as the set temperature rises. At the set temperature T2 on the high temperature side, the flow rate becomes maximum (100%).

In this fashion, the blowing unit 81 can be exploited as an adjusting unit, and the circulation rate of hot air can be changed by controlling the flow rate of the blowing unit 81 in accordance with the set temperature of hot air. Hence, effects similar to those in the first embodiment can be obtained.

Figure 16A:
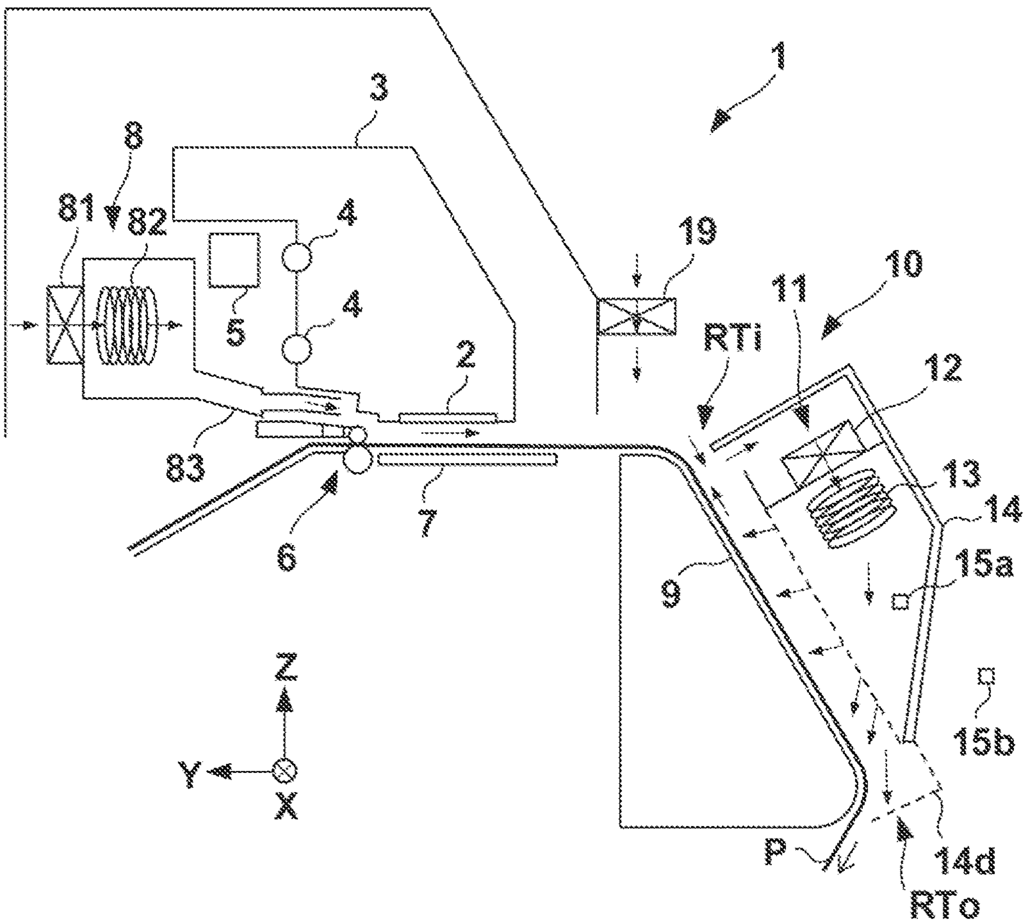
FIGS. 16A and 16B are views showing another arrangement example of the drying device.

Note that it may be configured to prevent, by blowing of the blowing unit 81, entrance of a mist of ink discharged from the discharging head 2 into the drying device 10. FIG. 16A shows an example of this arrangement. In the example shown in FIG. 16A, an air curtain fan 19 that blows air to the printing medium P is provided at a portion between a carriage 3 and the drying device 10. The air curtain fan 19 can be provided to reduce intake of an ink mist not reaching the printing medium P but floating into the drying device 10.

Eighth Embodiment

Figure 16B:
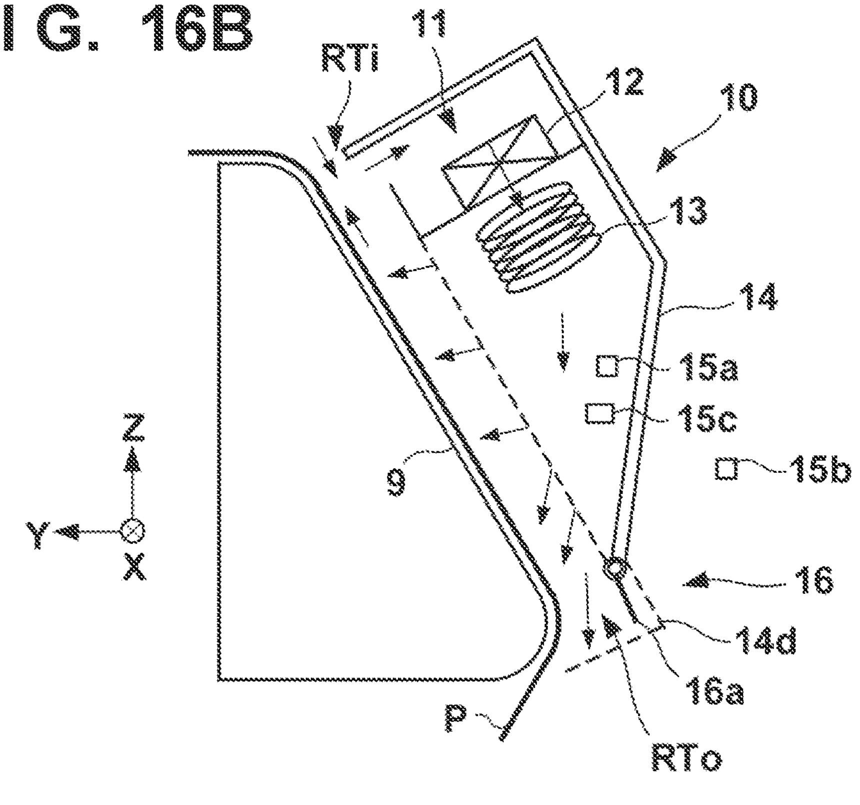

A humidity sensor that detects the humidity of air in a circulation path RT1 may be provided. FIG. 16B shows an example of this arrangement. In the example shown in FIG. 16B, a humidity sensor 15*c* is provided in an internal space SP in the arrangement of the first embodiment. The humidity sensor 15*c* can detect the humidity of inside air. The detection result can be used for control of an adjusting unit 16.

For example, the position of a movable member 16*a* is controlled to, when the humidity is low, decrease the opening ratio of an exhaust portion RTo so as to increase the circulation rate of inside air, and when the humidity is high, increase the opening ratio of the exhaust portion RTo so as to decrease the circulation rate of inside air. When the humidity is low, the power consumption can be reduced. When the humidity is high, the drying efficiency can be improved by decreasing the humidity of circulating hot air. This embodiment is applicable to even control of other adjusting units 17 to 18'.

Other Embodiments

The temperature sensors 15*a* and 15*b* are provided in the above embodiments, but an arrangement in which neither of these sensors is provided can also be employed.

The adjusting units 16 to 18' may also be controlled based on the amount of ink discharged from the discharging head 2 to the printing medium P. When the ink discharge amount is small, the adjusting unit may be controlled to increase the circulation rate of inside air. When the ink discharge amount is large, the adjusting unit may be controlled to decrease the circulation rate of inside air. Thus, when the ink discharge amount is small, the power consumption can be reduced. When the ink discharge amount is large, the drying efficiency can be improved by decreasing the humidity of circulating hot air. The ink discharge amount may be a discharge amount per unit area or a discharge amount per unit time.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-039882, filed Mar. 14, 2023, which is hereby incorporated by reference herein in its entirety.

What is claimed is:

1. A drying device comprising:

a conveying unit configured to convey a medium to which liquid is discharged from a discharging head;

a hot air blowing unit including a blowing unit configured to blow air, and a heating unit configured to heat air blown from the blowing unit;

a passage forming unit configured to form, between the hot air blowing unit and a region on a conveyance path of the conveying unit, a circulation path through which air blown from the hot air blowing unit is to be circulated;

an adjusting unit configured to adjust an amount of air outside the circulation path that is supplied to the blowing unit;

a temperature sensor configured to detect a temperature of air supplied to the blowing unit and configured to arrange on a downstream side of the heating unit;

and a control unit configured to control the adjusting unit, wherein the circulation path includes an introduction portion configured to introduce air outside the circulation path, and an exhaust portion configured to exhaust air inside the circulation path, wherein the adjusting unit includes a movable member configured to change an opening amount of the exhaust portion, and wherein the control unit controls the adjusting unit based on a detection result of the temperature sensor so that the temperature of air supplied to the blowing unit does not exceed a threshold temperature.

2. The drying device according to claim 1, wherein the adjusting unit is configured to adjust at least one of an introduction amount of outside air to the circulation path and an exhaust amount of inside air of the circulation path to outside the circulation path.

3. The drying device according to claim 1, wherein the adjusting unit is configured to adjust an exhaust amount at the exhaust portion.

4. The drying device according to claim 1, wherein the movable member is configured to be displaced by pivoting or linear motion.

5. The drying device according to claim 1, further comprising a holding unit configured to hold a position of the movable member.

6. The drying device according to claim 1, further comprising a position detection sensor configured to detect a position of the movable member, wherein the control unit controls the hot air blowing unit based on a detection result of the position detection sensor.

7. The drying device according to claim 1, wherein the adjusting unit further includes an external blowing unit configured to blow air toward the introduction portion.

8. The drying device according to claim 1, wherein the adjusting unit further includes:

an external blowing unit configured to blow air toward the introduction portion through a region where the discharging head discharges the liquid to the medium; and an external heating unit configured to heat air blown from the external blowing unit at a position on a side of the external blowing unit with respect to the region where the discharging head discharges the liquid to the medium.

9. The drying device according to claim 1, wherein the control unit controls the adjusting unit based on a set temperature of air blown to the medium.

10. The drying device according to claim 1, further comprising a second temperature sensor configured to detect a temperature of air outside the circulation path, wherein the control unit controls the adjusting unit based on a detection result of the second temperature sensor.

11. The drying device according to claim 1, further comprising a humidity sensor configured to detect a humidity of air inside the circulation path, wherein the control unit controls the adjusting unit based on a detection result of the humidity sensor.

12. The drying device according to claim 1, further comprising a cover member covering the exhaust portion and having an opening through which exhausted air passes.

13. The drying device according to claim 1, wherein the control unit controls the adjusting unit based on a discharge amount of the liquid from the discharging head to the medium.

14. The drying device according to claim 1, wherein, in a case where air flows in the circulation path, a circulating flow of air flows in order of the blowing unit, the heating unit, the region on the conveyance path, and the blowing unit, and wherein the adjusting unit is configured to adjust an amount of outside air introduced into the circulation path at a position upstream of the blowing unit and downstream of the region in a flow direction of the circulating flow.

15. The drying device according to claim 1, wherein the control unit controls the adjusting unit so as to increase the opening amount of the exhaust portion when the detection result of the temperature sensor indicates a temperature higher than the threshold temperature.

* * * * *